US012605678B2

(12) United States Patent
Wu et al.

(10) Patent No.: US 12,605,678 B2
(45) Date of Patent: Apr. 21, 2026

(54) METAL-ORGANIC FRAMEWORK MATERIAL SEPARATION MEMBRANE, PREPARATION METHOD THEREFOR, AND USE THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Changjiang Wu, Beijing (CN); Xin Wei, Beijing (CN); Hesheng Li, Beijing (CN); Xinmiao Zhang, Beijing (CN); Jie Sun, Beijing (CN); Chenghong Wang, Beijing (CN); Yujie Wang, Beijing (CN); Fanning Meng, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 435 days.

(21) Appl. No.: 18/248,754

(22) PCT Filed: Oct. 28, 2020

(86) PCT No.: PCT/CN2020/124309
§ 371 (c)(1),
(2) Date: Apr. 12, 2023

(87) PCT Pub. No.: WO2022/077562
PCT Pub. Date: Apr. 21, 2022

(65) Prior Publication Data

US 2023/0415101 A1 Dec. 28, 2023

(30) Foreign Application Priority Data

Oct. 15, 2020 (CN) ........................ 202011101303.4

(51) Int. Cl.
*B01D 53/22* (2006.01)
*B01D 67/00* (2006.01)
(Continued)

(52) U.S. Cl.
CPC ....... *B01D 67/0079* (2013.01); *B01D 53/228* (2013.01); *B01D 67/0083* (2013.01);
(Continued)

(58) Field of Classification Search
CPC .............. B01D 67/0079; B01D 71/301; B01D 67/00933; B01D 71/262; B01D 71/261;
(Continued)

(56) References Cited

U.S. PATENT DOCUMENTS 11,834,619 B1 * 12/2023 Liu .................... B01D 69/1411
2018/0272274 A1 9/2018 Kim et al.
(Continued)

FOREIGN PATENT DOCUMENTS

CN 104001426 A 8/2014
CN 104437116 A 3/2015
(Continued)

OTHER PUBLICATIONS

Farhad Ahmadijokani "UiO-66 metal-organic frameworks in water treatment: A critical review" Progress in Materials Science 125 ( 2022) 100904, pp. 1-24 (Year: 2022).*
(Continued)

*Primary Examiner* — Anthony Shumate
(74) *Attorney, Agent, or Firm* — NKL Law; Allen Xue

(57) ABSTRACT

A metal-organic framework material separation membrane and a preparation method for the metal-organic framework material separation membrane are provided. The metal-organic framework material separation membrane has a base
(Continued)

membrane and a metal-organic framework material functional layer. The metal-organic framework material functional layer comprises has an inter-embedded polyhedron structure. The preparation metal-organic framework material separation membrane includes the steps of: (1) preparing a solution containing a first organic solvent, an organic ligand, a metal compound, and an auxiliary agent; (2) subjecting a base membrane to a pretreatment, involving introducing, on the surface of the base membrane, metal atoms from the metal compound of step (1); and (3) mixing the pretreated base membrane of step (2) with the solution of step (1) to obtain a first mixture, and then heating the first mixture for reaction, so as to prepare a metal-organic framework material separation membrane.

26 Claims, 9 Drawing Sheets

(51) Int. Cl.

| | |
|---|---|
| ***B01D 69/02*** | (2006.01) |
| ***B01D 69/08*** | (2006.01) |
| ***B01D 71/26*** | (2006.01) |
| ***B01D 71/30*** | (2006.01) |
| ***C07F 7/00*** | (2006.01) |

(52) U.S. Cl.
CPC ....... *B01D 67/00933* (2022.08); *B01D 69/02* (2013.01); *B01D 69/08* (2013.01); *B01D 71/261* (2022.08); *B01D 71/262* (2022.08); *B01D 71/301* (2022.08); *C07F 7/003* (2013.01); *B01D 2323/081* (2022.08); *B01D 2323/10* (2013.01); *B01D 2323/385* (2013.01); *B01D 2325/02831* (2022.08); *B01D 2325/02832* (2022.08); *B01D 2325/02833* (2022.08); *B01D 2325/02834* (2022.08); *B01D 2325/22* (2013.01); *B01D 2325/24* (2013.01); *B01D 2325/30* (2013.01); *B01D 2325/38* (2013.01)

(58) Field of Classification Search
CPC .. B01D 53/228; B01D 67/0083; B01D 69/02; B01D 69/08; B01D 2323/081; B01D 2325/02834; B01D 2325/02833; B01D 2325/02832; B01D 2325/02831; B01D 2323/10; B01D 2323/385; B01D 2325/22; B01D 2325/24; B01D 2325/30; B01D 2325/38; C07F 7/003
See application file for complete search history.

(56) References Cited

U.S. PATENT DOCUMENTS

| | | | | |
|---|---|---|---|---|
| 2018/0320000 | A1* | 11/2018 | Zhang | A01N 43/50 |
| 2018/0326397 | A1* | 11/2018 | Yaghi | B01D 53/02 |
| 2020/0047114 | A1* | 2/2020 | Al-Maythalony | B01D 69/1071 |
| 2021/0146315 | A1* | 5/2021 | Oh | B01D 71/68 |
| 2021/0260535 | A1* | 8/2021 | Xu | B01D 71/06 |
| 2021/0384522 | A1* | 12/2021 | Kang | H01G 11/30 |
| 2022/0274062 | A1* | 9/2022 | Moxon | B01D 15/3828 |
| 2023/0001379 | A1* | 1/2023 | Zhao | B01D 71/06 |

FOREIGN PATENT DOCUMENTS

| | | | |
|---|---|---|---|
| CN | 106278368 | A | 1/2017 |
| CN | 106492651 | A | 3/2017 |
| CN | 108939958 | A | 12/2018 |
| CN | 110052185 | A | 7/2019 |
| JP | 2017202449 | A | 11/2017 |
| WO | 2015171970 | A1 | 11/2015 |
| WO | 2019175717 | A1 | 9/2019 |

OTHER PUBLICATIONS

Farhad Ahmadijokani "UiO-66 metal-organic frameworks in water treatment: A critical review" Progress in Materials Science 125 ( 2022) 100904, pp. 25-49 (Year: 2022).*

Farhad Ahmadijokani "UiO-66 metal-organic frameworks in water treatment: A critical review" Progress in Materials Science 125 ( 2022) 100904, pp. 50-60 (Year: 2022).*

Machine translation of CN 106492651 (Year: 2017).*

"N, N-Dimethylformamide" https://www.commonorganicchemistry.com/Common_Reagents/Dimethylformamide/Dimethylformamide.htm 1 page, retrieved Aug. 7, 2025 (Year: 2025).*

"Terephthalic acid" https://www.hpc-standards.us/shop/ReferenceMaterials/PolymerAdditives/Terephthalicacid.htm 1 page, retrieved Aug. 7, 2025 (Year: 2025).*

Nagarathinam Nagarjun "UiO-66(Ce) metal-organic framework as a highly active and selective catalyst for the aerobic oxidation of benzyl amines" Molecular Catalysis 499 (2021) 111277 (Year: 2021).*

Sigma-Aldrich "Zirconium(IV) chloride" https://www.sigmaaldrich.com/US/en/sds/aldrich/647640#:~:text=SECTION%203:%20Composition/information%20on,%3C=%20100%20%25 2024, 11 pages (Year: 2024).*

Farhad Ahmadijokani "UiO-66 metal-organic frameworks in water treatment: A critical review" Progress in Materials Science 125 ( 2022) 100904, pp. 61-72 (Year: 2022).*

Shan, Bohan et al., "Influences of Deprotonation and Modulation on Nucleation and Growth of UiO-66: Intergrowth and Orientation", Journal of Physical Chemistry C, vol. 122, No. 4, Jan. 2, 2018; pp. 1-13.

Wu, Feichao et al., "Synthesis of stable UiO-66 membranes for pervaporation separation of methanol/methyl tert-butyl ether mixtures by secondary growth", Journal of Membrane Science, vol. 544, Sep. 13, 2017; pp. 342-350.

Friebe, Sebastian et al.: "Metal-Organic Framework UiO-66 Layer: A Highly Oriented Membrane with Good Selectivity and Hydrogen Permeance", Applied Materials & Interfaces, Apr. 12, 2017, vol. 9, No. 14, ISSN: 1944-8244, pp. 12878-12885.

Rong, Rong et al.: "Fabrication of highly CO2/N2 selective polycrystalline UiO-66 membrane with two-dimensional transition metal dichalcogenides as zirconium source via tertiary solvothermal growth", Journal of Membrane Science, May 23, 2020, vol. 610, ISSN: 0376-7388, pp. 1-9.

Sheng, Luqian et al.: "Enhanced C3H6/C3H8 separation performance on MOF membranes through blocking defects and hindering framework flexibility by silicone rubber coating", Chemical Communications, Jan. 1, 2017, vol. 53, No. 55, ISSN: 1359-7345, pp. 7760-7763.

* cited by examiner

METAL-ORGANIC FRAMEWORK MATERIAL SEPARATION MEMBRANE, PREPARATION METHOD THEREFOR, AND USE THEREOF

FIELD OF THE INVENTION

The present invention relates to a metal-organic framework material separation membrane and a method for preparing the metal-organic framework material separation membrane, belonging to the technical field of organic gas separation membrane preparation.

BACKGROUND OF THE INVENTION

A gas membrane separation technology is a new technology which realizes separation of organics from a gas-phase host by utilizing the efficient selective permeability of a membrane material to the organics, and has the advantages of a continuous process, no heat release, no secondary pollution, a high recovery rate, low energy consumption, and miniaturization. At present, the gas membrane separation technology is a mainstream technology for separation of organics and management of volatile organic compounds (VOCs) in developed countries, and has a very wide range of applications in the fields of environmental protection, chemical industry, and biological pharmacy.

Most of the existing organic gas separation membranes are prepared by subjecting siloxanes to a coating process and cross-linking process, in which polydimethylsiloxane (PDMS) is most widely applied. A block copolymer (PEBA) is also a commonly used functional layer material of the organic gas separation membrane. The block copolymer (PEBA) combines two properties: the rigidness of polyamide (PA) material and the flexibility of polyether (PE) material, wherein the flexible polyether provides high permeability and will preferentially permeate the organics; and the rigid polyamide provides mechanical strength, and will avoid membrane swelling caused by excessive adsorption of organics, so as to maintain a high permselectivity. At present, a PDMS membrane has a relatively large flux, but has a loose molecular structure and is not easy to regulate and control, such that it has a low separation coefficient, and its selectivity to specific substances is difficult to improve. Although a PEBA membrane has the properties of two block molecules, it has a fixed molecular composition and a single structure, it is usually relatively dense, and it has a relatively high separation coefficient but has a small overall flux, such that it is limited in applications.

Exactly like people's original acknowledgment of the membrane, a "screening mechanism" membrane is characterized by: only allowing molecules smaller than the pore size of membrane pores to pass through and intercepting macromolecules which by strictly controlling the pore size of membrane pores, so as to achieve substance separation, thereby achieving a large flux and a high separation coefficient. However, since the diameter of gas molecules is mostly less than 1 nm, and the difference in molecular diameter among gas molecules is very small, a requirement for membrane structure is highly strict in order to achieve accurate screening. At present, there is no gas separation membrane with a screening mechanism that can be commercialized.

Metal-organic framework materials (MOFs) are a new type of porous material that has developed in recent years. Since the MOFs have the advantages of adjustable pore size, high specific surface area, stable structure, and easiness of functional modification, they have become a research focus of researchers at home and abroad. In the field of separation engineering, MOFs, as a new type of adsorbent, have shown a broad application prospect in the separation of organics and the removal and enrichment analysis of ions in water. However, the MOFs are only used during an adsorption process, which has problems such as discontinuous process, requirement of resolution, difficult regeneration of adsorbent, short life, etc.

Patent CN 110052185 A discloses a modification method based on dopamine UiO-66 membrane. The method comprises vertically immersing a porous substrate, with a fixed frame, in a precursor solution prepared by dissolving zirconium chloride and terephthalic acid in N,N-dimethylformamide, and subjecting the resultant to a thermal treatment under constant temperature conditions for 48-96 h; subjecting the resultant to an ultrasonic treatment for 3-30 s to obtain a substrate with seed crystals; re-subjecting the substrate deposited with the crystal seeds to a thermal treatment at least twice in the same way as described above until a continuous UiO-66 membrane is obtained; and subjecting the prepared membrane to a first soaking and a secondary soaking to obtain a polydopamine-grafted UiO-66 membrane. The polydopamine-grafted UiO-66 membrane has almost no inter-embedded UiO-66 structure therein, such that the membrane has poor compactness and its selectivity to specific substances is difficult to improve.

SUMMARY OF THE INVENTION

An objective of the present invention is to solve the problems in the prior art, such as difficulty in obtaining a continuous and complete MOFs separation functional layer, or frequent occurrence of shedding and defects due to loose binding between the separation functional layer and the base membrane, and the obtained separation membrane having a small flux, a low separation coefficient, a difficulty in improving selectivity to specific substances, and a discontinuous preparation process; and to prepare a membrane surface functional layer with a special microgeometry and achieve regulation and control of its structure and chemical composition, by constructing a metal-organic framework material separation functional layer with a continuous inter-embedded structure through a method comprising subjecting the base membrane to a specific pretreatment in combination with an in-situ growth reaction. Furthermore, a protective layer is formed outside the functional layer by coating, so as to fill in the defects that may exist in the functional layer, prevent the functional layer from being polluted and damaged during use, and improve the separation coefficient and service life of the separation membrane. In addition, according to the present invention, the separation membrane has a greater surface roughness and hydrophobicity on the surface thereof, achieves a stronger anti-pollution ability, and facilitates the contact between material molecules and the membrane surface, dissolution and penetration of the material molecules, thereby improving the flux of the membrane.

According to a first aspect of the present invention, a MOFs separation membrane is provided. The MOFs separation membrane comprises a base membrane and a MOFs functional layer, wherein the MOFs functional layer's structure comprises a plurality of inter-embedded polyhedron structures.

The inter-embedded polyhedron structure described in the present invention means that a partial structure of a polyhedron is inserted into other polyhedron structures adjacent or near thereto, or means that a polyhedron and one or more polyhedrons therearound share partial crystal lattices.

According to some embodiments of the present invention, the polyhedron is composed of a plurality of crystal lattices, and among the inter-embedded polyhedron structures, two adjacent polyhedrons share crystal lattices.

According to some embodiments of the present invention, among the inter-embedded polyhedron structures, a distance between centers of the two adjacent polyhedrons is less than an average value L of lengths of the two adjacent polyhedrons, preferably less than 0.95 L, more preferably 0.2-0.9 L.

In the present invention, the "average value L" refers to one half of the sum of the lengths of two polyhedrons. For example, if a length of polyhedron A is $L_1$ and a length of polyhedron B is $L_2$, $L==(L_1+L_2)/2$.

According to some embodiments of the present invention, at least 20% of the polyhedrons in the MOFs functional layer are inter-embedded, preferably at least 30%, preferably at least 40%, preferably at least 50%, preferably at least 60%, and preferably at least 80% of the polyhedrons are inter-embedded.

According to some embodiments of the present invention, the polyhedron includes a hexahedron structure and/or an octahedron structure.

According to some embodiments of the present invention, a length of the polyhedron is nm.

According to some embodiments of the present invention, the polyhedron is composed of a plurality of crystal lattices, wherein the crystal lattice is composed of metal atoms and organic ligands.

According to a preferred embodiment of the present invention, the metal atom is selected from zirconium atom, niobium atom, molybdenum atom or cobalt atom.

According to a preferred embodiment of the present invention, the organic ligand is selected from terephthalic acid or nitroterephthalic acid.

According to some embodiments of the present invention, a length of the hexahedron is 50-1000 nm, wherein the hexahedrons with a length of 400-600 nm account for 50-80%.

According to some embodiments of the present invention, a length of the octahedron is 200-2000 nm, wherein the octahedrons with a length of 800-1200 nm account for 60-80%.

The term "length of the polyhedron" in the present invention refers to a maximum length between vertices of the polyhedrons.

According to some embodiments of the present invention, the octahedron or hexahedron each is composed of a plurality of crystal lattices, and the crystal lattice is formed by multi-groups of zirconium metal atoms and terephthalic acids.

According to some embodiments of the present invention, the MOFs functional layer comprises one or more layers of inter-embedded polyhedron structures.

According to some embodiments of the present invention, a pore size of the MOFs functional layer is determined by an average size of the crystal lattices formed by metal atoms and organic ligands.

According to some embodiments of the present invention, the MOFs functional layer has an average pore size of 0.1-2.0 nm, preferably 0.30-0.96 nm.

According to some embodiments of the present invention, the MOFs functional layer has a thickness of 200-5000 nm.

According to some embodiments of the present invention, the MOFs functional layer has a thickness of 1000-5000 nm.

According to some embodiments of the present invention, the base membrane is selected from one or more of polypropylene membrane, polyethylene membrane, polyvinyl chloride membrane or polytetrafluoroethylene membrane.

According to some embodiments of the present invention, the base membrane has a pore size of 10-10000 nm, preferably 50-5000 nm, more preferably 200-1000 nm.

In some preferred embodiments of the present invention, the base membrane is a polypropylene membrane, a polyethylene membrane, a polyvinyl chloride membrane or a polytetrafluoroethylene membrane with a pore size of 50 nm-5000 nm prepared by melt-spinning stretching or thermally induced phase separation.

According to some embodiments of the present invention, the MOFs functional layer further comprises an auxiliary functional layer.

According to some embodiments of the present invention, the auxiliary functional layer is a part that is used to repair a place where the embedded octahedron structures or embedded hexahedron structures may not be completely formed.

According to some embodiments of the present invention, the separation membrane further comprises an organosilicon layer on the surface of the metal-organic framework material functional layer.

According to a second aspect of the present invention, a method for preparing a MOFs separation membrane is provided, comprising the following steps:

(1) preparing a solution containing a first organic solvent, an organic ligand, a first metal compound, and an auxiliary agent selected from water or glacial acetic acid;
(2) subjecting a base membrane to a pretreatment, involving introducing, on the surface of the base membrane, metal atoms from the first metal compound of step (1);
(3) mixing the pretreated base membrane of step (2) with the solution of step (1) to obtain a first mixture, and heating the first mixture for reaction, so as to obtain the MOFs separation membrane, and
(4) optionally, subjecting the separation membrane to a cleaning treatment to obtain a finished product.

According to some embodiments of the present invention, in step (1), a molar ratio of the first organic solvent, the organic ligand, and the first metal compound is (10-1000):(1-100):(1-100).

According to some embodiments of the present invention, in step (1), a molar ratio of the first organic solvent, the organic ligand, and the first metal compound is (100-1000):(1-10):(1-10).

According to some embodiments of the present invention, in step (1), a molar ratio of the first organic solvent, the organic ligand, and the first metal compound is (100-700):1:1, such as 100:1:1, 200:1:1, 250:1:1, 300:1:1, 350:1:1, 420:1:1, 450:1:1, 550:1:1, 610:1:1, 650:1:1 and any value therebetween.

According to some embodiments of the present invention, in step (1), a molar ratio of the first organic solvent, the organic ligand and the first metal compound is (400-600):1:1.

According to some embodiments of the present invention, in step (1), a molar ratio of the first organic solvent and the auxiliary agent water is 100:(0.001-0.05), such as 100:0.01 or 100:0.03.

According to a preferred embodiment of the present invention, in step (1), the water is used as the auxiliary agent, and the prepared metal-organic framework material functional layer comprises a plurality of inter-embedded octahedron structures therein.

According to some embodiments of the present invention, in step (1), a molar ratio of the first organic solvent and the auxiliary agent glacial acetic acid is 100:(20-60), such as 100:25, 100:30, 100:40 or 100:50.

According to a preferred embodiment of the present invention, in step (1), the glacial acetic acid is used as the auxiliary agent, and the prepared metal-organic framework material functional layer comprises a plurality of inter-embedded hexahedron structures therein.

According to some embodiments of the present invention, the first organic solvent is selected from one or more of N-methylpyrrolidone, N,N-dimethylformamide and dim ethylacetamide.

According to some embodiments of the present invention, the organic ligand is selected from terephthalic acid and/or nitroterephthalic acid.

According to some embodiments of the present invention, the first metal compound is selected from one or more of zirconium compound, niobium compound, molybdenum compound and cobalt compound, preferably zirconium tetrachloride.

According to some embodiments of the present invention, the base membrane is selected from one or more of polypropylene membrane, polyethylene membrane, polyvinyl chloride membrane or polytetrafluoroethylene membrane.

According to some embodiments of the present invention, a pore size of the base membrane is 10-10000 nm, preferably 50-5000 nm, more preferably 200-1000 nm.

In some preferred embodiments of the present invention, the base membrane is a polypropylene membrane, a polyethylene membrane, a polyvinyl chloride membrane or a polytetrafluoroethylene membrane with a pore size of 50 nm-5000 nm prepared by melt-spinning stretching or thermally induced phase separation.

According to some embodiments of the present invention, the step (2) comprises the following steps:

(2A-1) preparing a solution containing polyacrylic acid, polyvinyl alcohol and a second metal compound, and (2A-2) coating the solution of step (2A-1) on the base membrane.

According to some embodiments of the present invention, the polyacrylic acid includes polyacrylic acid and partially hydrolyzed polyacrylic acid.

According to some embodiments of the present invention, a mass concentration of the polyacrylic acid and the polyvinyl alcohol in the solution of the step (2A-1) is 500-2000 mg/L.

According to some embodiments of the present invention, in the solution of the step (2A-1), a molar ratio of a sum of the polyacrylic acid and the polyvinyl alcohol to the metal compound is 1-3:1.

According to some embodiments of the present invention, a metal atom in the second metal compound is the same as a metal atom in the first metal compound in step (1), and the second metal compound is preferably selected from one or more of zirconium compound, niobium compound, molybdenum compound and cobalt compound, preferably zirconium tetrachloride.

According to some embodiments of the present invention, in step (2A-2), a ratio of a surface area of the base membrane to a volume of the solution obtained in step (2A-1) is 0.1-10 $m^2/L$, such as 0.8 $m^2/L$, 1.2 $m^2/L$, 1.5 $m^2/L$, 1.7 $m^2/L$, 2.3 $m^2/L$, 2.5 $m^2/L$, 2.7 $m^2/L$, 3.0 $m^2/L$, 3.5 $m^2/L$, 4.0 $m^2/L$, 4.5 $m^2/L$, 5.0 $m^2/L$, 5.5 $m^2/L$, 6.0 $m^2/L$, 6.5 $m^2/L$, 7.0 $m^2/L$, 7.5 $m^2/L$, 8.0 $m^2/L$, 8.5 $m^2/L$, 9.0 $m^2/L$, 9.5 $m^2/L$ and any value therebetween.

According to some embodiments of the present invention, in step (2A-2), a ratio of a surface area of the base membrane to a volume of the solution obtained in step (2A-1) is 0.5-5 $m^2/L$.

In some preferred embodiments of the present invention, in step (2A-2), a ratio of a surface area of the base membrane to a volume of the solution obtained in step (2A-1) is 1-2 $m^2/L$.

In some preferred embodiments of the present invention, the step (2) comprises the following specific steps:

(a) mixing polyacrylic acid, partially hydrolyzed polyacrylic acid and polyvinyl alcohol with a mass concentration of 1000 mg/L and zirconium tetrachloride at a molar ratio of 2:1, and stirring for 1 h to obtain a mixed solution;

(b) coating the solution generated in step (a) on a surface of the base membrane, and then performing drying to allowing a certain amount of metal atoms to attach to the surface of the base membrane.

According to some embodiments of the present invention, the step (2) comprises the following steps:

(2B-1) preparing a solution containing a metal complex represented by formula I and a second organic solvent, (2B-2) mix the base membrane with the solution of step (2B-1), and (2B-3) cleaning the mixed base membrane in step (2B-2) by using a third solvent;

Formula I

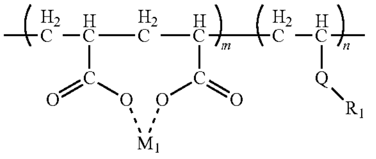

in formula I, Q is selected from acylamino, carbonyl or C1-C6 alkylene; $R_1$ is selected from hydrogen, C1-C6 alkyl, C1-C6 alkoxy or halogen; $M_1$ is the same as a metal atom in the first metal compound in step (1), and preferably, $M_1$ is selected from zirconium atom, niobium atom, molybdenum atom or cobalt atom; m is 5-20; and n is 1-10.

According to some embodiments of the present invention, in formula I, Q is selected from acylamino, $R_1$ is selected from C3-C6 alkyl group, m is 5-20; and n is 1-10.

According to some embodiments of the present invention, the metal complex represented by formula I is:

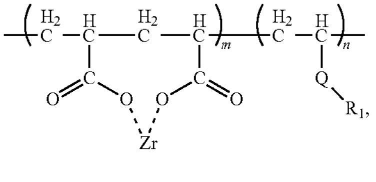

wherein, m=5-20, and n=1-10.

According to some embodiments of the present invention, the metal complex represented by formula I is:

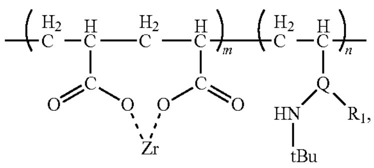

wherein, m=5-20, and n=1-10.

According to some embodiments of the present invention, the second organic solvent is selected from one or more of organic solvents capable of allowing the base membrane to swell, is preferably selected from one or more of C5-C10 aliphatic hydrocarbon, C1-C10 halogenated aliphatic hydrocarbon, C6-C20 aromatic hydrocarbon and C6-C20 halogenated aromatic hydrocarbon, and is more preferably selected from one or more of n-pentane, n-hexane, trichloromethane, carbon tetrachloride, benzene and toluene.

According to some embodiments of the present invention, the third solvent is selected from one or more solvents capable of allowing the swollen base membrane to deswell, and is preferably selected from water.

According to some embodiments of the present invention, in the solution of step (2B-1), a mass concentration of the metal complex represented by formula I is 500-2000 mg/L.

According to some embodiments of the present invention, in step (2B-2), a ratio of a surface area of the base membrane to a volume of the solution obtained in step (2B-1) is 0.1-10 $m^2/L$, such as 0.8 $m^2/L$, 1.2 $m^2/L$, 1.5 $m^2/L$, 1.7 $m^2/L$, 2.3 $m^2/L$, 2.5 $m^2/L$, 2.7 $m^2/L$, 3.0 $m^2/L$, 3.5 $m^2/L$, 4.0 $m^2/L$, 4.5 $m^2/L$, 5.0 $m^2/L$, 5.5 $m^2/L$, 6.0 $m^2/L$, 6.5 $m^2/L$, 7.0 $m^2/L$, 7.5 $m^2/L$, 8.0 $m^2/L$, 8.5 $m^2/L$, 9.0 $m^2/L$, 9.5 $m^2/L$ and any value therebetween.

According to some embodiments of the present invention, in step (2B-2), a ratio of a surface area of the base membrane to a volume of the solution obtained in step (2B-1) is 0.5-5 $m^2/L$.

In some advantageous embodiments of the present invention, in step (2B-2), a ratio of a surface area of the base membrane to a volume of the solution obtained in step (2B-1) is 1-2 $m^2/L$.

In some preferred embodiments of the present invention, the step (2) comprises the following specific steps:

(a) dissolving acrylic acid-N-tert-butyl acrylamide/zirconium complex in n-hexane, and dissolving the resultant in a solvent at a mass concentration of 1000 mg/L, to obtain a uniform solution;

(b) immersing the base membrane in the solution of step (a) for 1-24 h, taking out and quickly transferring to deionized water for cleaning, take out and drying to obtain a modified base membrane, wherein, partial acrylic acid-N-tert-butyl acrylamide/zirconium complex is inserted in a surface layer of the embedded base membrane structure, so as to introduce a certain amount of stable zirconium atoms into the base membrane.

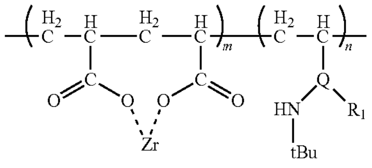

Acrylic acid-N-tert-butyl acrylamide/zirconium

According to some embodiments of the present invention, the step (2) comprises the following steps:

(2C-1) preparing a solution containing a metal complex represented by formula II, and (2C-2) mixing the base membrane with the solution of step (2C-1) to obtain a mixture, and subjecting the mixture to polymerization reaction under microwave radiation conditions;

Formula II

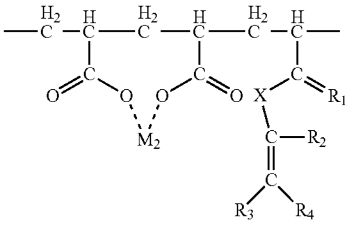

in formula II, X is selected from acylamino, carbonyl or C1-C6 alkylene; $R_2$, $R_3$ and $R_4$ are the same or different, each independently selected from hydrogen, C1-C6 alkyl, C1-C6 alkoxy or halogen; and $M_2$ is the same as a metal atom in the first metal compound in step (1), and preferably, $M_2$ is selected from zirconium atom, niobium atom, molybdenum atom or cobalt atom.

According to some embodiments of the present invention, in formula II, X is selected from acylamino; and $R_2$, $R_3$ and $R_4$ are the same or different, each independently selected from hydrogen and C1-C3 alkyl group.

According to some embodiments of the present invention, the metal complex represented by formula II is:

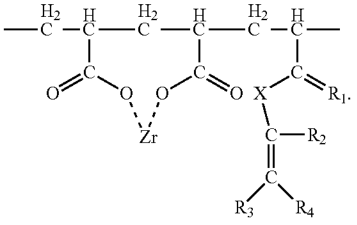

According to some embodiments of the present invention, the metal complex represented by formula II is:

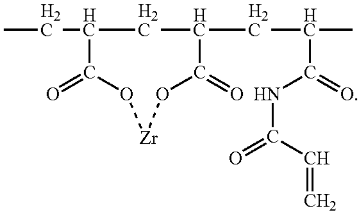

According to some embodiments of the present invention, the solution of the metal complex in step (2C-1) is an aqueous solution of the metal complex.

According to some embodiments of the present invention, in the solution of step (2C-1), a mass concentration of the metal complex represented by formula II is 500-20000 mg/L.

According to some embodiments of the present invention, in step (2C-2), a ratio of a surface area of the base membrane to a volume of the solution obtained in step (2C-1) is 0.1-10 $m^2/L$, such as 0.8 $m^2/L$, 1.2 $m^2/L$, 1.5 $m^2/L$, 1.7 $m^2/L$, 2.3 $m^2/L$, 2.5 $m^2/L$, 2.7 $m^2/L$, 3.0 $m^2/L$, 3.5 $m^2/L$, 4.0 $m^2/L$, 4.5 $m^2/L$, 5.0 $m^2/L$, 5.5 $m^2/L$, 6.0 $m^2/L$, 6.5 $m^2/L$, 7.0 $m^2/L$, 7.5 $m^2/L$, 8.0 $m^2/L$, 8.5 $m^2/L$, 9.0 $m^2/L$, 9.5 $m^2/L$ and any value therebetween.

According to some embodiments of the present invention, in step (2C-2), a ratio of a surface area of the base membrane to a volume of the solution obtained in step (2C-1) is 0.5-5 $m^2/L$.

According to some preferred embodiments of the present invention, in step (2C-2), a ratio of a surface area of the base membrane to a volume of the solution obtained in step (2C-1) is 1-2 $m^2/L$.

According to some embodiments of the present invention, in step (2C-2), a microwave intensity of the microwave radiation is 500-2000 $\mu w/cm^2$.

According to some embodiments of the present invention, in step (2C-2), a microwave frequency of the microwave radiation is 1000-200000 Hz.

In some preferred embodiments of the present invention, the step (2) comprises the following specific steps:

(a) dissolving acrylic acid-N-dipropylene enamine/zirconium complex in aqueous solution, to obtain a grafting polymerization solution;

(b) immersing the base membrane in the grafting polymerization solution obtained in step (a); and (c) performing radiation grafting polymerization under a certain intensity of microwave radiation, to initiate methyl groups on the base membrane to generate radicals, such that a grafting polymerization reaction occurs between the radicals and double bonds in the acrylic acid-N-dipropylene enamine/zirconium complex in the grafting polymerization solution, so as to obtain a modified base membrane and introduce zirconium atoms on the surface thereof.

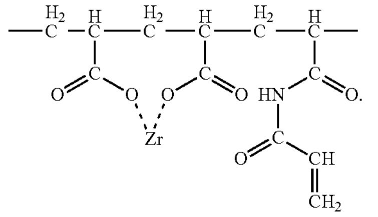

Acrylic acid-N-dipropylene enamine/zirconium complex

In the present invention, after the base membrane is subjected to the pretreatment, on the one hand, metal atoms can be introduced onto the base membrane to allow the MOFs functional layer to firmly combine with the base membrane; on the other hand, the metal atoms introduced onto the base membrane can provide metal nodes for the subsequent formation of the MOFs functional layer by means of in-situ growth, such that the inter-embedded structures will be formed during the growth of the MOFs functional layer, thereby avoiding the generation of defects.

According to some embodiments of the present invention, in step (3), a ratio of a surface area of the pretreated base membrane in step (2) to a volume of the solution obtained in step (1) is (0.01-100) $m^2/L$, preferably (0.01-10) $m^2/L$; more preferably 0.5-2 $m^2/L$.

According to a preferred embodiment of the present invention, in said step (3), before the base membrane is added to the solution obtained in step (1), the following treatment may be performed: a surface of the base membrane (or a prepared membrane assembly) is sequentially washed with water and organic solvent, and dried, wherein the organic solvent is preferably ethanol, methanol or acetone; and preferably, the base membrane (or the prepared membrane assembly) is washed twice with water, washed twice with organic solvent and dried.

According to some embodiments of the present invention, the step (3) comprises:

heating the first mixture to allow the organic ligand to react with the metal compound to generate MOFs material on a surface of the base membrane, so as to obtain the separation membrane.

According to a preferred embodiment of the present invention, in the step (3), a reaction temperature is 50-300° C., preferably 100-200° C.

According to a preferred embodiment of the present invention, in step (3), a reaction pressure is 0.01-0.5 MPa (gauge pressure), and preferably, the reaction pressure is 0.05-0.1 MPa (gauge pressure).

According to a preferred embodiment of the present invention, in the step (3), a reaction time is 1-100 h, such as 5 h, 17 h, 20 h, 25 h, 27 h, 30 h, 40 h, 50 h, 60 h, 70 h, 80 h, 90 h and any value therebetween.

According to a preferred embodiment of the present invention, in the step (3), a reaction time is 10-72 h, preferably 15-30 h.

According to a preferred embodiment of the present invention, the step (3) may be performed in an inert gas atmosphere, and preferably, the inert gas is nitrogen gas.

According to some embodiments of the present invention, in the step (4), the separation membrane is taken out (or the polymer solution in the membrane assembly is discharged); and after polymerization, the surface of the membrane is cleaned with organic solvent and water for several times, such that the free monomers and the solvent are removed, to obtain the MOFs organic gas separation membrane (or the membrane assembly). The organic solvent for cleaning the surface of the membrane comprises ethanol, methanol or acetone. Preferably, the separation membrane is washed twice with water, washed twice with organic solvent and dried.

According to some embodiments of the present invention, the method for preparing the MOFs separation membrane further comprises the following steps:

(5) subjecting the MOFs separation membrane obtained from step (3) or (4) to a repairing treatment for one or more time(s), which preferably comprises:

(A) mixing the MOFs separation membrane with a solution containing a first organic solvent, an organic ligand, a first metal compound and an auxiliary agent to obtain a second mixture, wherein the auxiliary agent is selected from water or glacial acetic acid;

(B) heating the second mixture for reaction to obtain the MOFs separation membrane; and (C) optionally, subjecting the separation membrane to a cleaning treatment to obtain a finished product.

According to some embodiments of the present invention, the step (A) comprises:

(A1) preparing a solution containing a first organic solvent, an organic ligand, a first metal compound and an auxiliary agent selected from water or glacial acetic acid;

(A2) adding the MOFs separation membrane obtained from step (2) or (3) to the solution obtained in step (A1) to obtain the second mixture.

According to a preferred embodiment of the present invention, a molar ratio of the first organic solvent, the organic ligand and the first metal compound in step (A) is (10-1000):(1-100):(1-100); preferably (100-1000):(1-10):(1-10), more preferably (100-700):1:1, such as 100:1:1, 200:1:1, 250:1:1, 300:1:1, 350:1:1, 400:1:1, 420:1:1, 550:1:1, 600:1:1, 1 or 650:1:1 and any value therebetween.

According to a preferred embodiment of the present invention, in step (A), a molar ratio of the first organic solvent and the auxiliary agent water is 100:(0.001-0.05), such as 100:0.01 or 100:0.03.

According to a preferred embodiment of the present invention, in step (A), a molar ratio of the first organic solvent and the auxiliary glacial acetic acid is 100:(20-60), such as 100:25, 100:30, 100:40 or 100:50.

According to a preferred embodiment of the present invention, in the step (A2), a ratio of a surface area of the MOFs separation membrane to a volume of the solution in step (A1) is (0.01-100) $m^2/L$; preferably (0.01-10) $m^2/L$; more preferably 1 $m^2/L$.

According to a preferred embodiment of the present invention, the step (B) comprises: heating the second mixture to allow the organic ligand to react with the first metal compound, so as to continue to generate MOFs materials on the surface of the MOFs organic gas separation membrane.

According to a preferred embodiment of the present invention, in the step (B), a reaction temperature is 50-300° C., a reaction pressure is 0.01-0.5 MPa (gauge pressure), and a reaction time is 1-100 h.

According to a preferred embodiment of the present invention, in the step (B), a reaction temperature is 100-200° C., a reaction pressure is 0.05-0.1 MPa (gauge pressure), and a reaction time is 5-50 h.

According to a preferred embodiment of the present invention, in the step (B), a reaction time is 10-20 h.

According to a preferred embodiment of the present invention, the step (B) can be performed in an inert gas atmosphere, and preferably, the inert gas is nitrogen gas.

According to some embodiments of the present invention, in the step (C), the separation membrane is taken out (or the polymer solution in the membrane assembly is discharged); and after polymerization, the surface of the membrane is cleaned with organic solvent and water for several times, such that the free monomers and the solvent are removed, to obtain the MOFs organic gas separation membrane (or the membrane assembly). The organic solvent for cleaning the surface of the membrane comprises ethanol, methanol or acetone. Preferably, the separation membrane is washed twice with water, washed twice with organic solvent and dried.

According to some embodiments of the present invention, the method for preparing the MOFs separation membrane of the present invention further comprises the following steps: coating a silane coating liquid on a surface of the MOFs separation membrane prepared in step (3) or (4) or (B) or (C), heating the MOFs separation membrane coated with the silane coating liquid, to subjecting the silane coating liquid to crosslinking reaction, so as to obtain a MOFs separation membrane including an organosilicon layer.

According to some embodiments of the present invention, the silane coating liquid can be coated on the surface of the MOFs separation membrane prepared in step (4) or step (C) by methods such as dip-coating, blade coating, etc., such that the surface of the MOFs separation membrane is coated with a layer of silane coating liquid with a thickness of 1-100 microns, preferably 25 microns.

According to some embodiments of the present invention, a temperature of the crosslinking reaction is 50-300° C., preferably 50-200° C., more preferably 150° C.; and a time therefor is 0.1-20 h, preferably 0.1-10 h, more preferably 0.5 h.

After crosslinking reaction, a cross-linked silane protective layer is formed on the surface of the MOFs organic gas separation membrane.

According to some embodiments of the present invention, a method for preparing the silane coating liquid comprises the following steps:

S1, mixing silane, crosslinking agent and organic solvent for dissolution to obtain a mixture solution;

S2, adding catalyst to the mixture solution to perform pre-crosslinking, to obtain the silane coating liquid.

According to some embodiments of the present invention, a ratio of the silane, the crosslinking agent and the organic solvent in step S1 is (0.1-10):(0.1-10):(90-100), preferably (1-10):(1-10):(90-100), more preferably 9:1:90.

According to a preferred embodiment of the present invention, the silane can be a monomer of siloxane material, and includes dimethylsiloxane, cured silicone rubber and vulcanized silicone rubber alone or combination thereof in any proportion; and/or, the crosslinking agent includes ethyl orthosilicate or tetramethoxy silane; and/or, the organic solvent includes at least one of heptane, pentane, toluene, benzene, xylene and hexane, and is preferably n-hexane.

According to a preferred embodiment of the present invention, the catalyst can be an organotin-based catalyst such as dibutyltin dilaurate, etc., or a titanium-complex-based catalyst such as tetrabutyl titanate etc. The catalyst is used in an amount of 0.01-1 wt %, preferably 0.01-0.1 wt %.

According to some embodiments of the present invention, a pre-crosslinking time in step S2 is 1-48 h, preferably 10-30 h, more preferably 24 h; and/or, a viscosity of the silane coating liquid is 100-50000 mPa·s, preferably 100-5000 mPa·s, more preferably 2000 mPa·s.

According to some embodiments of the present invention, the method for preparing the MOFs separation membrane further comprises the following steps:

adding the prepared MOFs separation membrane to an alkali solution for pore size regulation and control. In the process of the regulation and control, partial chemical bonds between zirconium atoms and organics will be broken, such that the permeability of the functional layer and the connectivity of the internal crystal lattices are increased, so as to obtain a required separation pore size and a more appropriate flux.

According to some embodiments of the present invention, the alkaline solution is preferably sodium hydroxide solution with pH of 9-13. The process of the adding is accompanied by stirring, and a flow rate obtained by stirring is 0.01-1 m/s, preferably 0.1 m/s. A time therefor is min, preferably 30-60 min.

According to a third aspect of the present invention, a MOFs separation membrane prepared by the method for preparing the MOFs separation membrane described in the second aspect is provided.

According to a fourth aspect of the present invention, a use of the MOFs separation membrane described in the first aspect or the MOFs separation membrane prepared by the method described in the second aspect in separation of organics is provided.

According to some embodiments of the present invention, the MOFs separation membrane can be used for benzene-related organics, such as benzene, toluene, xylene, etc.

According to some embodiments of the present invention, the MOFs separation membrane can be used for the separation of alkanes such as methane, ethane, propane, butane, pentane, hexane, heptane, cyclohexane, isopentane, etc., and unsaturated alkane gases such as ethylene, propylene, acetylene, butene, styrene, etc., as well as the volatile gas thereof from nitrogen gas and air.

According to some embodiments of the present invention, the separation can be one-stage or multi-stage membrane separation.

According to some embodiments of the present invention, in helium gas purification and separation, the MOFs separation membrane can be used in combination with cryogenic, dehydrogenation and deoxygenation processes.

According to some embodiments of the present invention, in the separation of olefins and alkanes, the MOFs separation membrane can be used in combination with cryogenic process, distillation and PSA.

According to some embodiments of the present invention, in the field of organic gas separation, the MOFs separation membrane can be developed into a complete set of processes in combination with condensation technology, adsorption technology, absorption technology, etc.

Compared with the prior art, the MOFs separation membrane and the preparation method of the MOFs separation membrane provided by the present invention have the following advantages:

(1) The preparation process is simple, easy to operate and low in cost;

(2) The prepared MOFs functional layer has excellent chemical dissolution resistance, high temperature resistance and relatively high mechanical strength;

(3) The MOFs functional layer has inter-embedded polyhedrons therein, is spread on the surface of the base membrane, is dense and continuous, and is thin in thickness and uniform in pore size distribution, such that the membrane has a relatively large flux and a high separation coefficient;

(4) The organosilicone protective layer has hydrophobicity and air permeability, which can avoid the damage of water vapor and particulates to the MOFs functional layer; and (5) Since a high-performance organic gas separation membrane prepared by the method described in the present invention has above excellent performances, it may be well applied in the fields of petrochemistry, biology, pharmacy, energy sources, environmental protection, etc.

DETAILED DESCRIPTION OF THE EMBODIMENTS

Figure 1:
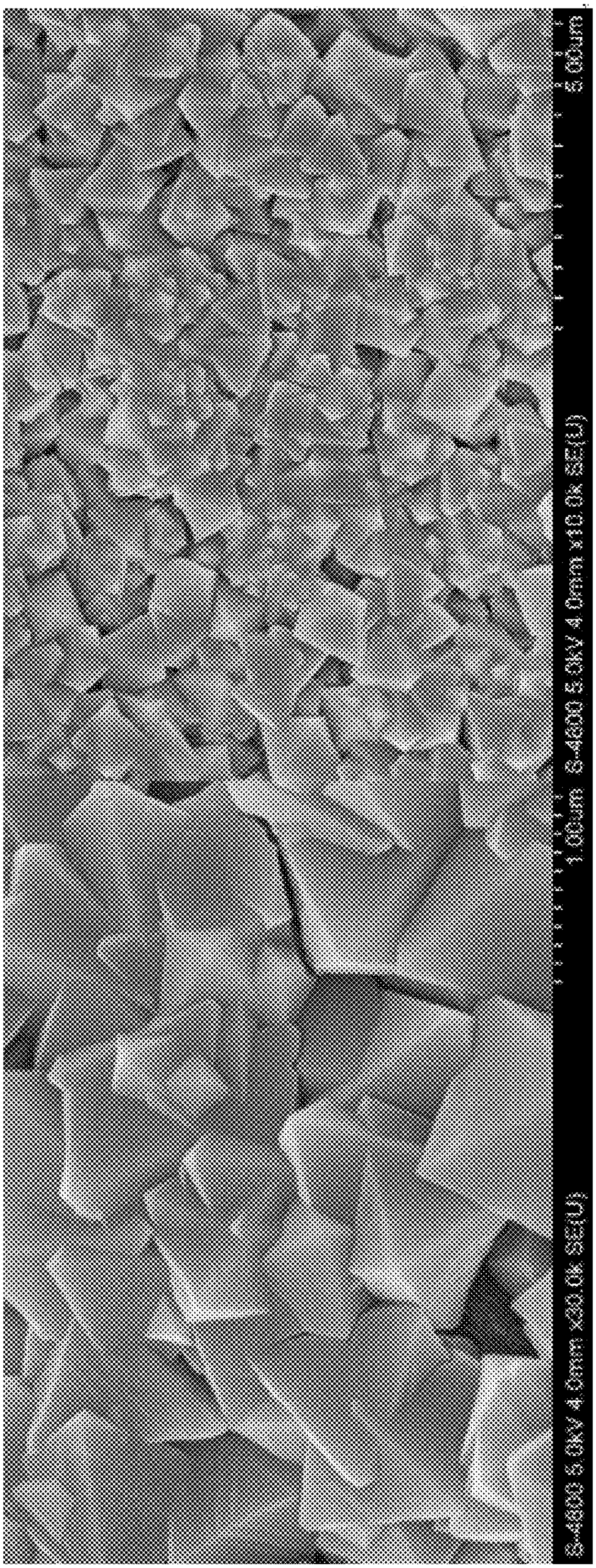
FIG. 1 shows an electron micrograph of a surface of the MOFs organic gas separation membrane prepared in Example 1.

The present invention will be further described by means of examples, but is not limited to these examples.

Unless otherwise specified, the raw materials used in the examples are commercially available, and the chemicals mentioned are public chemicals in the prior art.

(1) A structural formula of acrylic acid-N-tert-butyl acrylamide/zirconium complex in the examples is represented as follows:

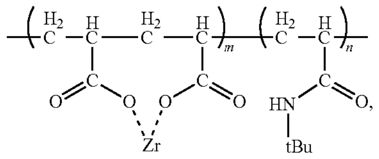

wherein, m=12, n=1;

Preparation method: 47 g of acrylic acid was taken and dissolved in 250 g of deionized water, and pH value was adjust to 7-9 with NaOH solution; and 50 g of deionized water was taken, to which 12 g of sodium dodecyl sulfate (SDS) and 8.9 g of nonylphenol polyoxyethylene ether (NP) were added, and 3 g of tert-butyl acrylamide monomer was added under continuous and uniform stirring to form a uniform and stable clear solution. After the obtained two kinds of solution were mixed, then were put into an adiabatic polymerization kettle; after nitrogen gas was filled for about 10 minutes to remove oxygen gas, a redox initiator (ammonium persulfate-sodium bisulfate (each is added as 1% aqueous solution obtained by dissolving 0.05 g of a solid pure product in deionized water)) was added; and after the resultant solution become thick, the gas filling was stopped to allow the reaction to proceed under spontaneous temperature rise. After 6-8 hours, the reaction was completed to obtain a hydrogel product, which was then cut into pieces, baked to dryness at 50° C., and powdered to obtain an acrylic acid-tert butyl acrylamide copolymer. The copolymer was dissolved in water at a certain concentration, and a zirconium acetate salt was added to obtain the above poly acrylic acid-tert butyl acrylamide-zirconium coordination copolymer.

(2) A structural formula of the acrylic acid-N-dipropylene enamine/zirconium complex in the examples is represented as follows:

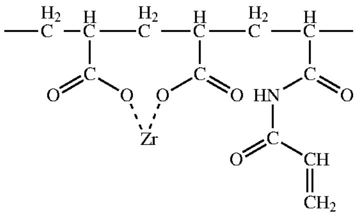

Preparation method: 120 g of acrylic acid was taken and dissolved in 80 g of deionized water, and pH value was adjust to 7-9 with NaOH solution; and 20 g of deionized water was taken, to which 6 g of methylene bisacrylamide was added to form a uniform and stable clear solution. 95 g of industrial 5 #white oil was taken, to which an appropriate amount of 7.65 g of Span80 and 10 g of Tween80 were added, and the resultant was stirred to form a stable and uniform solution. A first part of the obtained aqueous phase was mixed with the obtained oil phase, and emulsified with an emulsifying machine to form a stable reversed-phase emulsion, which was then put in a polymerization kettle and cooled. An ammonium persulfate initiator solution (0.05 g of ammonium persulfate was dissolved in deionized water, to obtain 1% aqueous solution) was firstly added. A sodium bisulfite solution (0.05 g pure solid was dissolved in deionized water to obtain 1% aqueous solution) and a second part of the methylene bisacrylamide solution was slowly added dropwise under uniform stirring and under the nitrogen gas filling for protection. The reaction was slightly exothermic. The stirring was continued for 2 hours after the dropwise addition was completed. Thereafter, an emulsion was taken out, into which isopropanol/acetone was poured to produce a white precipitate. After the precipitate was obtained by centrifugation, it was washed with ethanol, to obtain a copolymer of acrylic acid and methylene bisacrylamide. The copolymer was dissolved in water, to which zirconium acetate was added to form the above copolymer.

Test Method

Figure 10:
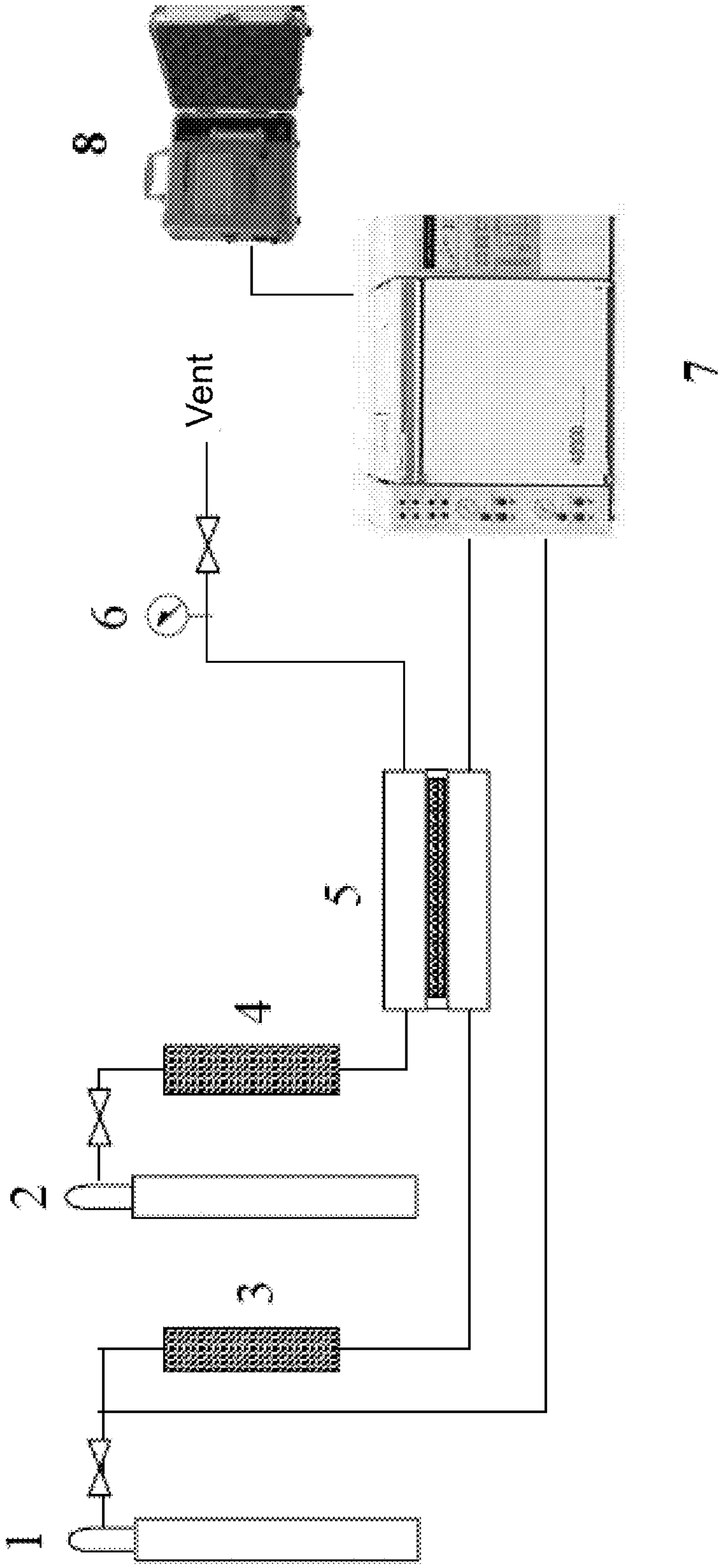
FIG. 10 shows a schematic view of a test device for membrane performance.

The separation performance of the membrane was tested for a mixed gas of nitrogen gas/organic vapor by using an analytical method described in the literature (Study on separation of organic vapor/nitrogen system through composite hollow fiber membrane, He Chunhong, Tianjin University, 2005). A test device was shown in FIG. 10.

A typical structure of a gas separation membrane is formed by covering a very thin dense layer on a porous support. It is difficult to accurately measure a true thickness of the dense layer. Therefore, a permeability coefficient and an effective thickness of the membrane are usually used in combination. A ratio of the permeability coefficient and the effective thickness of the membrane is referred as a permeation rate, which is calculated by the following equation:

$$J_i = (P/l)_i = Q_i/(\Delta p \cdot A) \quad (1\text{-}1)$$

In the above equation, $J_i$ is a permeation rate of gas component i, in mol/(m$^2$·s·Pa); P is a permeability coefficient of gas component i, in mol·m/(m$^2$·s·Pa); l is an effective thickness of the membrane, in m; $Q_i$ is a molar flow of component i in permeation gas under standard conditions, in mol/s; ΔP is an osmotic pressure difference, in Pa; and A is an area of the membrane, in m$^2$.

A separation coefficient α is calculated by the following equation:

$$\alpha_{N2\ organic\ gas} = J_{N2}/J_{organic\ gas} \quad (1\text{-}2)$$

Example 1

(1) A solution required for the preparation of a MOFs membrane

N-methylpyrrolidone, terephthalic acid, zirconium tetrachloride and pure water were mixed in a molar ratio of 400:1:1:0.01 and fully stirred to obtain the solution required for the preparation of the MOFs membrane.

(2) Base membrane pretreatment (a) Polyacrylic acid, partially hydrolyzed polyacrylic acid and polyvinyl alcohol with a mass concentration of 1000 mg/L and zirconium tetrachloride were mixed in a molar ratio of 2:1, and stirred for 1 h to obtain a solution after reaction;

(b) After a polypropylene hollow fiber base membrane with a pore size of 500 nm was washed with water and ethanol and dried, the solution prepared in step (a) was coated on a dried surface of the base membrane in a ratio of a surface area of the base membrane to the solution described in step (a) being 1 m$^2$/L (that is, the membrane with a surface area of 1 square meter was coated with 1 L of the prepared solution described in step (a)), and then dried to allow a certain amount of zirconium atoms to attach to the surface of the base membrane, so as to obtain a pretreated base membrane.

(3) The pretreated base membrane was immersed into the solution for the preparation of the MOFs in a ratio of a surface area of the pretreated base membrane to the solution described in step (1) being 1 m$^2$/L (that is, the membrane with a surface area of 1 square meter was put in 1 L of the solution for the preparation of the MOFs described in step (1)), to obtain a first mixture, which was then subjected to reaction for in-situ growth at 120° C. for 24 h under filling of nitrogen gas for protection, to obtain a separation membrane.

(4) The separation membrane prepared in step (3) was take out, and the unreacted monomers and the solvent on the membrane surface were cleaned away to obtain a MOFs organic gas separation membrane.

(5) The separation membrane in step (4) was cleaned to obtain a MOFs organic gas separation membrane.

An electron micrograph of the surface of the prepared membrane was shown in FIG. 1. It can be seen from FIG. 1 that a MOFs functional layer of the prepared membrane was composed of inter-embedded octahedron crystals, was spread on the surface of the base membrane, was dense and continuous, and had a high surface roughness; the base membrane was completely covered; and the functional layer had few defects.

The test data for the performance of the membrane were shown in Table 1, which showed that, for a mixed gas of propylene and nitrogen gas, the flux of the nitrogen gas at 0.1 Mpa can reach $4.828\times10^{-6}$ mol/(m$^2$·s·Pa), while the flux of the propylene gas was only $0.301\times10^{-6}$ mol/(m$^2$·s·Pa); and a separation coefficient for nitrogen gas/propylene was 16.03.

Example 2

Example 2 only differs from Example 1 in that, in the base membrane pretreatment of step (2), the solution prepared in step (a) was coated on a dried surface of the base membrane in a ratio of a surface area of the base membrane to the solution described in step (a) being 0.1 m$^2$/L (that is, the membrane with a surface area of 0.1 square meter was coated with 1 L of the prepared solution described in step (a)).

The test data for the performance of the membrane were shown in Table 1, which showed that, for a mixed gas of propylene and nitrogen gas, the flux of the nitrogen gas at 0.1 Mpa can reach $2.01\times10^{-6}$ mol/($m^2$·s·Pa), while the flux of the propylene gas was only $0.18\times10^{-6}$ mol/($m^2$·s·Pa); and a separation coefficient for nitrogen gas/propylene was 11.17.

Example 3

Example 3 only differs from Example 1 in that, in the base membrane pretreatment of step (2), the solution prepared in step (a) was coated on a dried surface of the base membrane in a ratio of a surface area of the base membrane to the solution described in step (a) being 5 $m^2$/L (that is, the membrane with a surface area of 5 square meter was coated with 1 L of the prepared solution described in step (a)).

The test data for the performance of the membrane were shown in Table 1, which showed that, for a mixed gas of propylene and nitrogen gas, the flux of the nitrogen gas at 0.1 Mpa can reach $10.41\times10^{-6}$ mol/($m^2$·s·Pa), while the flux of the propylene gas was only $1.206\times10^{-6}$ mol/($m^2$·s·Pa); and a separation coefficient for nitrogen gas/propylene was 8.63.

Example 4

Example 4 only differs from Example 1 in that, in the base membrane pretreatment of step (2), the solution prepared in step (a) was coated on a dried surface of the base membrane in a ratio of a surface area of the base membrane to the solution described in step (a) being 10 $m^2$/L (that is, the membrane with a surface area of 10 square meter was coated with 1 L of the prepared solution described in step (a)).

The test data for the performance of the membrane were shown in Table 1, which showed that, for a mixed gas of propylene and nitrogen gas, the flux of the nitrogen gas at 0.1 Mpa can reach $17.733\times10^{-6}$ mol/($m^2$·s·Pa), while the flux of the propylene gas was only $1.909\times10^{-6}$ mol/($m^2$·s·Pa); and a separation coefficient for nitrogen gas/propylene was 9.29.

TABLE 1

| | The ratio of the surface area of the base membrane to the solution described in step (a) $m^2$/L | The flux of nitrogen gas $10^{-6}$ mol/ ($m^2$ · s · Pa) | The flux of propylene $10^{-6}$ mol/ ($m^2$ · s · Pa) | The separation coefficient for nitrogen gas/propylene |
|---|---|---|---|---|
| Example 1 | 1 | 4.828 | 0.301 | 16.04 |
| Example 2 | 0.1 | 2.01 | 0.18 | 11.17 |
| Example 3 | 5 | 10.41 | 1.206 | 8.63 |
| Example 4 | 10 | 17.733 | 1.909 | 9.29 |

Example 5

(1) A solution required for the preparation of a MOFs membrane

N-methylpyrrolidone, terephthalic acid, zirconium tetrachloride and pure water were mixed in a molar ratio of 400:1:1:0.01 and fully stirred to obtain the solution required for the preparation of the MOFs membrane.

(2) Base membrane pretreatment (a) acrylic acid-N-tert-butyl acrylamide/zirconium complex was dissolved in n-hexane with a mass concentration of 1000 mg/L to obtain a uniform solution;

(b) After a polypropylene hollow fiber base membrane with a pore size of 500 nm was washed with water and ethanol and dried, the dried base membrane was immersed in the solution prepared in step (a) in a ratio of a surface area of the base membrane to the solution described in step (a) being 1 $m^2$/L (that is, the membrane with a surface area of 1 square meter was put in 1 L of the prepared solution described in step (a)) for 2 h, taken out and quickly transferred into deionized water for cleaning, and then taken out and dried to obtain a modified base membrane, in which partial acrylic acid-N-tert-butyl acrylamide/zirconium complex was inserted into a surface layer of the embedded base membrane structure, so as to introduce a certain amount of stable zirconium atoms into the base membrane.

(3) The pretreated base membrane was immersed into the solution for the preparation of the MOFs in a ratio of a surface area of the pretreated base membrane to the solution described in step (1) being 1 $m^2$/L (that is, the membrane with a surface area of 1 square meter was put in 1 L of the solution for the preparation of the MOFs described in step (1)), to obtain a first mixture, which was then subjected to reaction for in-situ growth at 200° C. for 24 h under filling of nitrogen gas for protection, to obtain a separation membrane.

(4) The separation membrane prepared in step (3) was take out, and the unreacted monomers and the solvent on the membrane surface were cleaned away to obtain a MOFs organic gas separation membrane.

(5) The separation membrane in step (4) was cleaned to obtain a MOFs organic gas separation membrane.

Figure 2:
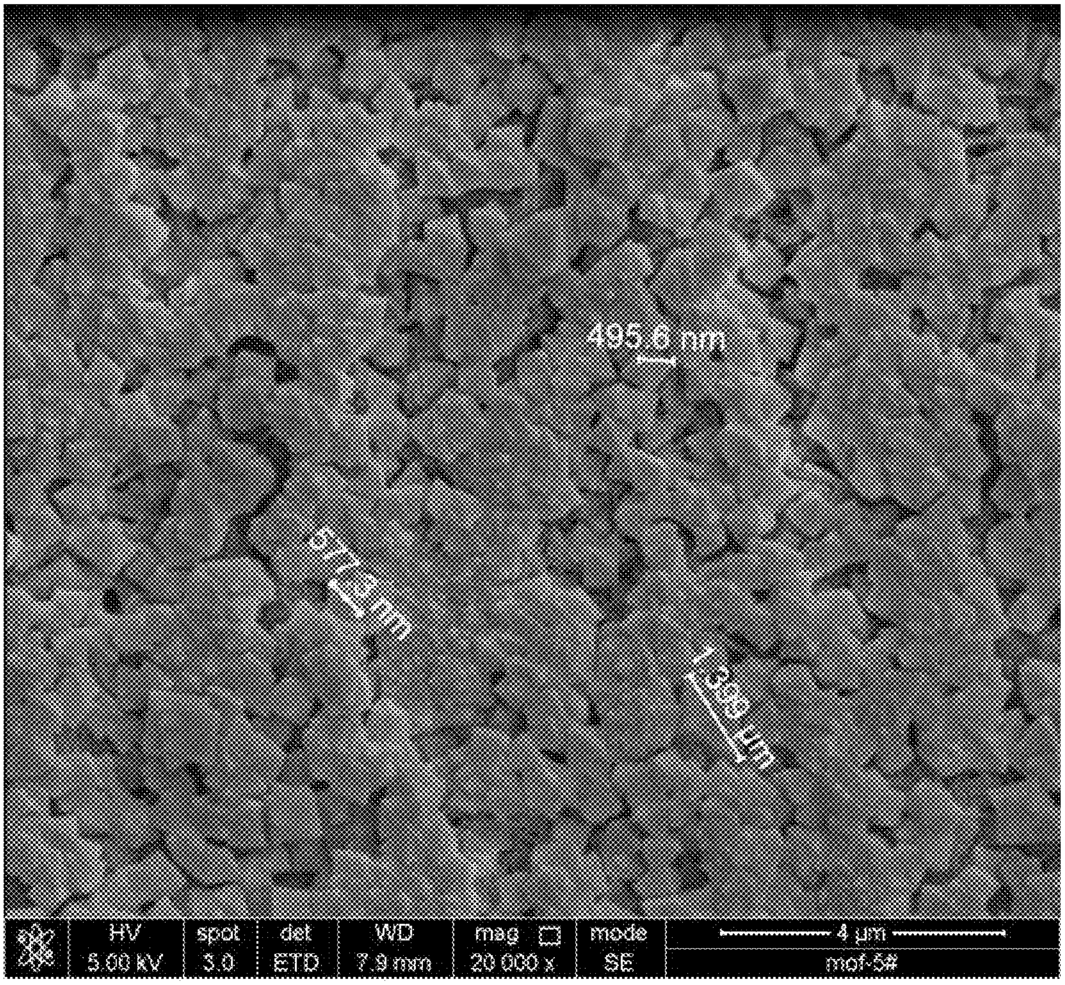
FIG. 2 shows an electron micrograph of a surface of the MOFs organic gas separation membrane prepared in Example 5.

An electron micrograph of the surface of the prepared membrane was shown in FIG. 2.

The test data for the performance of the membrane were shown in Table 2, which showed that, for a mixed gas of propylene and nitrogen gas, the flux of the nitrogen gas at 0.1 Mpa can reach $1.521\times10^{-6}$ mol/($m^2$·s·Pa), while the flux of the propylene gas was only $0.088\times10^{-6}$ mol/($m^2$·s·Pa); and a separation coefficient for nitrogen gas/propylene was 17.28.

Example 6

Example 6 only differs from Example 5 in that, in the base membrane pretreatment of step (2), the dried base membrane was immersed in the solution prepared in step (a) in a ratio of a surface area of the base membrane to the solution described in step (a) being 0.1 $m^2$/L (that is, the membrane with a surface area of 0.1 square meter was put in 1 L of the prepared solution described in step (a)).

The test data for the performance of the membrane were shown in Table 2, which showed that, for a mixed gas of propylene and nitrogen gas, the flux of the nitrogen gas at 0.1 Mpa can reach $1.01\times10^{-6}$ mol/($m^2$·s·Pa), while the flux of the propylene gas was only $0.12\times10^{-6}$ mol/($m^2$·s·Pa); and a separation coefficient for nitrogen gas/propylene was 8.42.

Example 7

Example 7 only differs from Example 5 in that, in the base membrane pretreatment of step (2), the dried base membrane was immersed in the solution prepared in step (a) in a ratio of a surface area of the base membrane to the solution described in step (a) being 5 $m^2/L$ (that is, the membrane with a surface area of 5 square meter was put in 1 L of the prepared solution described in step (a)).

The test data for the performance of the membrane were shown in Table 2, which showed that, for a mixed gas of propylene and nitrogen gas, the flux of the nitrogen gas at 0.1 Mpa can reach $2.89\times10^{-6}$ mol/($m^2$·s·Pa), while the flux of the propylene gas was only $0.188\times10^{-6}$ mol/($m^2$·s·Pa); and a separation coefficient for nitrogen gas/propylene was 15.37.

Example 8

Example 8 only differs from Example 5 in that, in the base membrane pretreatment of step (2), the dried base membrane was immersed in the solution prepared in step (a) in a ratio of a surface area of the base membrane to the solution described in step (a) being 10 $m^2/L$ (that is, the membrane with a surface area of 10 square meter was put in 1 L of the prepared solution described in step (a)).

The test data for the performance of the membrane were shown in Table 2, which showed that, for a mixed gas of propylene and nitrogen gas, the flux of the nitrogen gas at 0.1 Mpa may reach $3.50\times10^{-6}$ mol/($m^2$·s·Pa), while the flux of the propylene gas was only $0.215\times10^{-6}$ mol/($m^2$·s·Pa); and a separation coefficient for nitrogen gas/propylene was 16.28.

TABLE 2

| | The ratio of the surface area of the base membrane to the solution described in step (a) $m^2/L$ | The flux of nitrogen gas $10^{-6}$ mol/ ($m^2$ · s · Pa) | The flux of propylene $10^{-6}$ mol/ ($m^2$ · s · Pa) | The separation coefficient for nitrogen gas/propylene |
|---|---|---|---|---|
| Example 5 | 1 | 1.521 | 0.088 | 17.28 |
| Example 6 | 0.1 | 1.01 | 0.12 | 8.42 |
| Example 7 | 5 | 2.89 | 0.188 | 15.37 |
| Example 8 | 10 | 3.50 | 0.215 | 16.28 |

Example 9

(1) A solution required for the preparation of a MOFs membrane

N-methylpyrrolidone, terephthalic acid, zirconium tetrachloride and pure water were mixed in a molar ratio of 100:1:1:0.001 and fully stirred to obtain the solution required for the preparation of the MOFs membrane.

(2) Base membrane pretreatment (a) acrylic acid-N-tert-butyl acrylamide/zirconium complex was dissolved in a solution, and then dissolved in water with a mass concentration of 1000 mg/L to obtain a grafting polymerization solution;

(b) After a polypropylene hollow fiber base membrane with a pore size of 500 nm was washed with water and ethanol and dried, the dried base membrane was immersed in the solution prepared in step (a) in a ratio of a surface area of the base membrane to the solution described in step (a) being 1 $m^2/L$ (that is, the membrane with a surface area of 1 square meter was put in 1 L of the prepared solution described in step (a)), and a radiation grafting polymerization was allowed to proceed under microwave radiation with an intensity of 1000 μw/$cm^2$ and a frequency of 1000-200000 Hz for 2 h, to initiate methyl groups on the base membrane to generate radicals, such that a grafting polymerization reaction occurs between the radicals and double bonds in the acrylic acid-N-dipropylene enamine/zirconium complex in the grafting polymerization solution, so as to obtain a modified base membrane and introduce zirconium atoms on the surface thereof.

(3) The pretreated base membrane was immersed into the solution for the preparation of the MOFs in a ratio of a surface area of the pretreated base membrane to the solution described in step (1) being 1 $m^2/L$ (that is, the membrane with a surface area of 1 square meter was put in 1 L of the solution for the preparation of the MOFs described in step (1)), to obtain a first mixture, which was then subjected to reaction for in-situ growth at 200° C. for 24 h under filling of nitrogen gas for protection, to obtain a separation membrane.

(4) The separation membrane prepared in step (3) was take out, and the unreacted monomers and the solvent on the membrane surface were cleaned away to obtain a MOFs organic gas separation membrane.

(5) The separation membrane in step (4) was cleaned to obtain a MOFs organic gas separation membrane.

Figure 3:
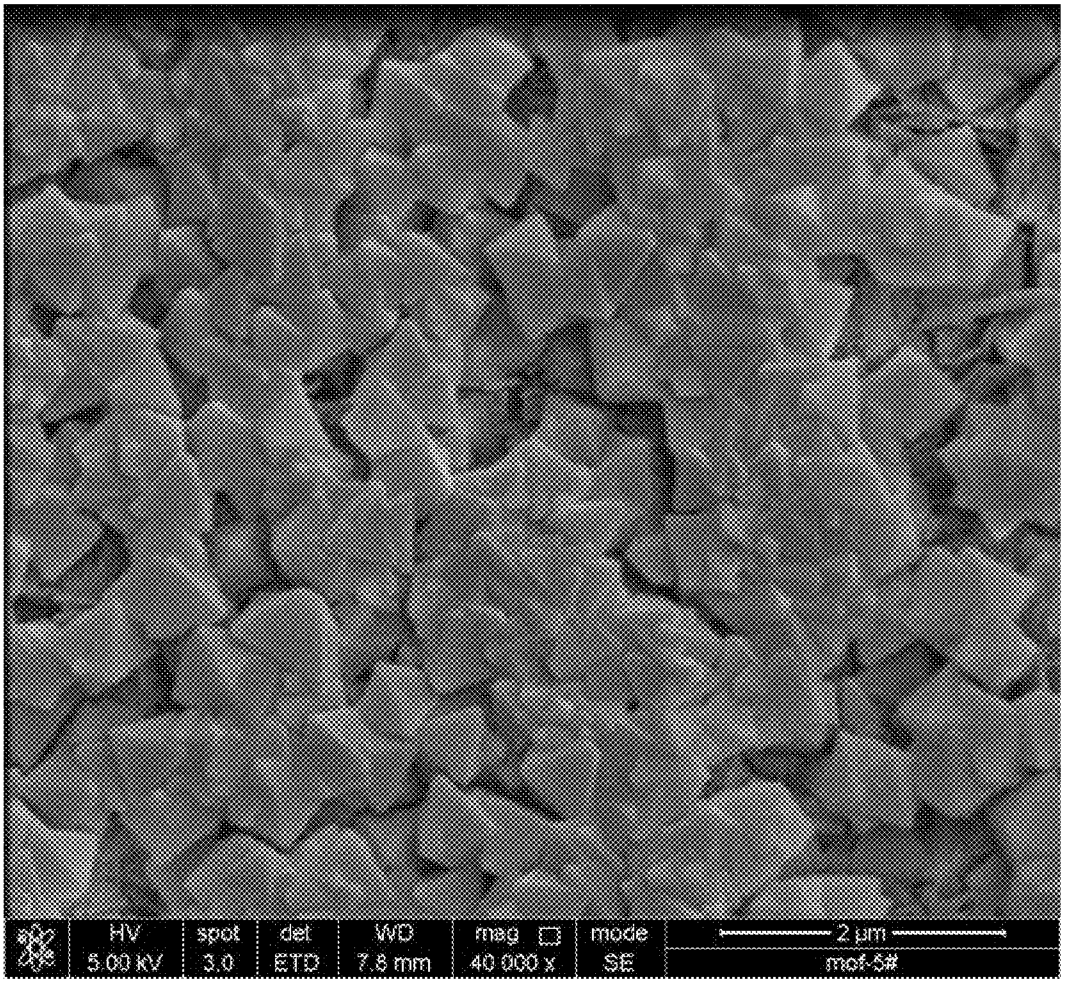
FIG. 3 shows an electron micrograph of a surface of the MOFs organic gas separation membrane prepared in Example 9.

An electron micrograph of the surface of the prepared membrane was shown in FIG. 3.

The test data for the performance of the membrane were shown in Table 3, which showed that, for a mixed gas of propylene and nitrogen gas, the flux of the nitrogen gas at 0.1 Mpa can reach $1.41\times10^{-6}$ mol/($m^2$·s·Pa), while the flux of the propylene gas was only $0.047\times10^{-6}$ mol/($m^2$·s·Pa); and a separation coefficient for nitrogen gas/propylene was 30.00.

Example 10

Example 10 only differs from Example 9 in that, in the base membrane pretreatment of step (2), the dried base membrane was immersed in the solution prepared in step (a) in a ratio of a surface area of the base membrane to the solution described in step (a) being 0.1 $m^2/L$ (that is, the membrane with a surface area of 0.1 square meter was put in 1 L of the prepared solution described in step (a)) for grafting polymerization under radiation.

The test data for the performance of the membrane were shown in Table 3, which showed that, for a mixed gas of propylene and nitrogen gas, the flux of the nitrogen gas at 0.1 Mpa can reach $0.341\times10^{-6}$ mol/($m^2$·s·Pa), while the flux of the propylene gas was only $0.0114\times10^{-6}$ mol/($m^2$·s·Pa); and a separation coefficient for nitrogen gas/propylene was 29.91.

Example 11

Example 11 only differs from Example 9 in that, in the base membrane pretreatment of step (2), the dried base membrane was immersed in the solution prepared in step (a) in a ratio of a surface area of the base membrane to the solution described in step (a) being 5 $m^2/L$ (that is, the membrane with a surface area of 5 square meter was put in 1 L of the prepared solution described in step (a)) for grafting polymerization under radiation.

The test data for the performance of the membrane were shown in Table 3, which showed that, for a mixed gas of propylene and nitrogen gas, the flux of the nitrogen gas at 0.1 Mpa can reach $1.884\times10^{-6}$ mol/($m^2$·s·Pa), while the flux of the propylene gas was only $0.074\times10^{-6}$ mol/($m^2$·s·Pa); and a separation coefficient for nitrogen gas/propylene was 25.46.

Example 12

Example 12 only differs from Example 9 in that, in the base membrane pretreatment of step (2), the dried base membrane was immersed in the solution prepared in step (a) in a ratio of a surface area of the base membrane to the solution described in step (a) being 10 $m^2$/L (that is, the membrane with a surface area of 10 square meter was put in 1 L of the prepared solution described in step (a)) for grafting polymerization under radiation.

The test data for the performance of the membrane were shown in Table 3, which showed that, for a mixed gas of propylene and nitrogen gas, the flux of the nitrogen gas at 0.1 Mpa can reach $2.984\times10^{-6}$ mol/($m^2$·s·Pa), while the flux of the propylene gas was only $0.121\times10^{-6}$ mol/($m^2$·s·Pa); and a separation coefficient for nitrogen gas/propylene was 24.66.

TABLE 3

| | The ratio of the surface area of the base membrane to the solution described in step (a) $m^2$/L | The flux of nitrogen gas $10^{-6}$ mol/ ($m^2$ · s · Pa) | The flux of propylene $10^{-6}$ mol/ ($m^2$ · s · Pa) | The separation coefficient for nitrogen gas/propylene |
|---|---|---|---|---|
| Example 9 | 1 | 1.41 | 0.047 | 30.00 |
| Example 10 | 0.1 | 0.341 | 0.0114 | 29.91 |
| Example 11 | 5 | 1.884 | 0.074 | 25.46 |
| Example 12 | 10 | 2.984 | 0.121 | 24.66 |

Example 13

(1) A solution required for the preparation of a MOFs membrane

N-methylpyrrolidone, terephthalic acid, zirconium tetrachloride and pure water were mixed in a molar ratio of 400:1:1:150 and fully stirred to obtain the solution required for the preparation of the MOFs membrane.

(2) Base membrane pretreatment (a) Polyacrylic acid, partially hydrolyzed polyacrylic acid and polyvinyl alcohol with a mass concentration of 1000 mg/L and zirconium tetrachloride were mixed in a molar ratio of 2:1, and stirred for 1 h to obtain a solution after reaction;

(b) After a polyethylene hollow fiber base membrane with a pore size of 500 nm was washed with water and ethanol and dried, the solution prepared in step (a) was coated on a dried surface of the base membrane in a ratio of a surface area of the base membrane to the solution described in step (a) being 1 $m^2$/L (that is, the membrane with a surface area of 1 square meter was coated with 1 L of the prepared solution described in step (a)), and then dried to allow a certain amount of zirconium atoms to attach to the surface of the base membrane.

(3) The pretreated base membrane was immersed into the solution for the preparation of the MOFs in a ratio of a surface area of the pretreated base membrane to the solution described in step (1) being 1 $m^2$/L (that is, the membrane with a surface area of 1 square meter was put in 1 L of the solution for the preparation of the MOFs described in step (1)), to obtain a first mixture, which was then subjected to reaction for in-situ growth at 200° C. for 24 h under filling of nitrogen gas for protection, to obtain a separation membrane.

(4) The separation membrane prepared in step (3) was take out, and the unreacted monomers and the solvent on the membrane surface were cleaned away to obtain a MOFs organic gas separation membrane.

(5) The separation membrane in step (4) was cleaned to obtain a MOFs organic gas separation membrane.

Figure 4:
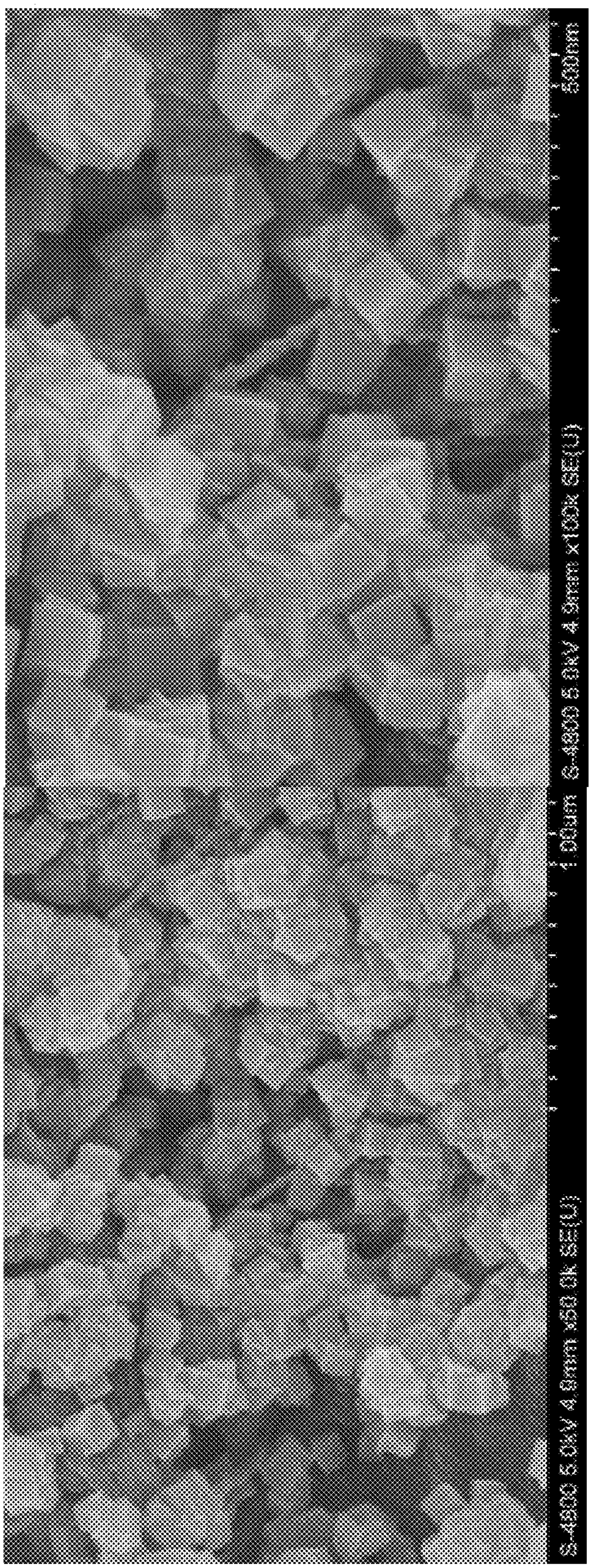
FIG. 4 shows an electron micrograph of a surface of the MOFs organic gas separation membrane prepared in Example 13.

An electron micrograph of the surface of the prepared membrane was shown in FIG. 4.

The test data for the performance of the membrane were shown in Table 4, which showed that, for a mixed gas of propylene and nitrogen gas, the flux of the nitrogen gas at 0.1 Mpa can reach $0.896\times10^{-6}$ mol/($m^2$·s·Pa), while the flux of the propylene gas was only $0.047\times10^{-6}$ mol/($m^2$·s·Pa); and a separation coefficient for nitrogen gas/propylene was 19.06.

Example 14

Example 14 only differs from Example 13 in that, in the base membrane pretreatment of step (2), the solution prepared in step (a) was coated on a dried surface of the base membrane in a ratio of a surface area of the base membrane to the solution described in step (a) being 0.1 $m^2$/L (that is, the membrane with a surface area of 0.1 square meter was coated with 1 L of the prepared solution described in step (a)).

The test data for the performance of the membrane were shown in Table 4, which showed that, for a mixed gas of propylene and nitrogen gas, the flux of the nitrogen gas at 0.1 Mpa can reach $0.288\times10^{-6}$ mol/($m^2$·s·Pa), while the flux of the propylene gas was only $0.0095\times10^{-6}$ mol/($m^2$·s·Pa); and a separation coefficient for nitrogen gas/propylene was 30.32.

Example 15

Example 15 only differs from Example 13 in that, in the base membrane pretreatment of step (2), the solution prepared in step (a) was coated on a dried surface of the base membrane in a ratio of a surface area of the base membrane to the solution described in step (a) being 5 $m^2$/L (that is, the membrane with a surface area of 5 square meter was coated with 1 L of the prepared solution described in step (a)).

The test data for the performance of the membrane were shown in Table 4, which showed that, for a mixed gas of propylene and nitrogen gas, the flux of the nitrogen gas at 0.1 Mpa can reach $1.208\times10^{-6}$ mol/($m^2$·s·Pa), while the flux of the propylene gas was only $0.1659\times10^{-6}$ mol/($m^2$·s·Pa); and a separation coefficient for nitrogen gas/propylene was 7.28.

Example 16

Example 16 only differs from Example 13 in that, in the base membrane pretreatment of step (2), the solution prepared in step (a) was coated on a dried surface of the base membrane in a ratio of a surface area of the base membrane to the solution described in step (a) being 10 $m^2/L$ (that is, the membrane with a surface area of 10 square meter was coated with 1 L of the prepared solution described in step (a)).

The test data for the performance of the membrane were shown in Table 4, which showed that, for a mixed gas of propylene and nitrogen gas, the flux of the nitrogen gas at 0.1 Mpa may reach $1.48\times10^{-6}$ mol/($m^2$·s·Pa), while the flux of the propylene gas was only $0.2659\times10^{-6}$ mol/($m^2$·s·Pa); and a separation coefficient for nitrogen gas/propylene was 5.57.

TABLE 4

| | The ratio of the surface area of the base membrane to the solution described in step (a) $m^2/L$ | The flux of nitrogen gas $10^{-6}$ mol/ ($m^2\cdot s\cdot Pa$) | The flux of propylene $10^{-6}$ mol/ ($m^2\cdot s\cdot Pa$) | The separation coefficient for nitrogen gas/propylene |
|---|---|---|---|---|
| Example 13 | 1 | 0.896 | 0.047 | 19.06 |
| Example 14 | 0.1 | 0.288 | 0.0095 | 30.32 |
| Example 15 | 5 | 1.208 | 0.1659 | 7.28 |
| Example 16 | 10 | 1.48 | 0.2659 | 5.57 |

Example 17

(1) A solution required for the preparation of a MOFs membrane

N-methylpyrrolidone, terephthalic acid, zirconium tetrachloride and glacial acetic acid were mixed in a molar ratio of 200:1:1:100 and fully stirred to obtain the solution required for the preparation of the MOFs membrane.

(2) Base membrane pretreatment (a) acrylic acid-N-tert-butyl acrylamide/zirconium complex was dissolved in n-hexane with a mass concentration of 1000 mg/L to obtain a uniform solution;

(b) After a polyethylene hollow fiber base membrane with a pore size of 500 nm was washed with water and ethanol and dried, the dried base membrane was immersed in the solution prepared in step (a) in a ratio of a surface area of the base membrane to the solution described in step (a) being 10 $m^2/L$ (that is, the membrane with a surface area of 10 square meter was put in 1 L of the prepared solution described in step (a)) for 10 h, taken out and quickly transferred into deionized water for cleaning, and then taken out and dried to obtain a modified base membrane, in which partial acrylic acid-N-tert-butyl acrylamide/zirconium complex was inserted into a surface layer of the embedded base membrane structure, so as to introduce a certain amount of stable zirconium atoms into the base membrane.

(3) The pretreated base membrane was immersed into the solution for the preparation of the MOFs in a ratio of a surface area of the pretreated base membrane to the solution described in step (1) being 1 $m^2/L$ (that is, the membrane with a surface area of 1 square meter was put in 1 L of the solution for the preparation of the MOFs described in step (1)), to obtain a first mixture, which was then subjected to reaction for in-situ growth at 200° C. for 24 h under filling of nitrogen gas for protection, to obtain a separation membrane.

(4) The separation membrane prepared in step (3) was take out, and the unreacted monomers and the solvent on the membrane surface were cleaned away to obtain a MOFs organic gas separation membrane.

(5) The separation membrane in step (4) was cleaned to obtain a MOFs organic gas separation membrane.

The test data for the performance of the membrane were shown in Table 5, which showed that, for a mixed gas of propylene and nitrogen gas, the flux of the nitrogen gas at 0.1 Mpa can reach $2.468\times10^{-6}$ mol/($m^2$·s·Pa), while the flux of the propylene gas was only $0.115\times10^{-6}$ mol/($m^2$·s·Pa); and a separation coefficient for nitrogen gas/propylene was 21.46.

Example 18

Example 18 only differs from Example 17 in that, in the base membrane pretreatment of step (2), the dried base membrane was immersed in the solution prepared in step (a) in a ratio of a surface area of the base membrane to the solution described in step (a) being 0.1 $m^2/L$ (that is, the membrane with a surface area of 0.1 square meter was put in 1 L of the prepared solution described in step (a)).

The test data for the performance of the membrane were shown in Table 5, which showed that, for a mixed gas of propylene and nitrogen gas, the flux of the nitrogen gas at 0.1 Mpa can reach $0.3008\times10^{-6}$ mol/($m^2$·s·Pa), while the flux of the propylene gas was only $0.0184\times10^{-6}$ mol/($m^2$·s·Pa); and a separation coefficient for nitrogen gas/propylene was 16.35.

Example 19

Example 19 only differs from Example 17 in that, in the base membrane pretreatment of step (2), the dried base membrane was immersed in the solution prepared in step (a) in a ratio of a surface area of the base membrane to the solution described in step (a) being 1 $m^2/L$ (that is, the membrane with a surface area of 1 square meter was put in 1 L of the prepared solution described in step (a)).

The test data for the performance of the membrane were shown in Table 5, which showed that, for a mixed gas of propylene and nitrogen gas, the flux of the nitrogen gas at 0.1 Mpa can reach $1.241\times10^{-6}$ mol/($m^2$·s·Pa), while the flux of the propylene gas was only $0.038\times10^{-6}$ mol/($m^2$·s·Pa); and a separation coefficient for nitrogen gas/propylene was 32.66.

Example 20

Example 20 only differs from Example 17 in that, in the base membrane pretreatment of step (2), the dried base membrane was immersed in the solution prepared in step (a) in a ratio of a surface area of the base membrane to the solution described in step (a) being 5 $m^2/L$ (that is, the membrane with a surface area of 5 square meter was put in 1 L of the prepared solution described in step (a)).

The test data for the performance of the membrane were shown in Table 5, which showed that, for a mixed gas of propylene and nitrogen gas, the flux of the nitrogen gas at 0.1 Mpa can reach $2.198\times10^{-6}$ mol/($m^2$·s·Pa), while the flux of the propylene gas was only $0.087\times10^{-6}$ mol/($m^2$·s·Pa); and a separation coefficient for nitrogen gas/propylene was 25.26.

TABLE 5

| | The ratio of the surface area of the base membrane to the solution described in step (a) $m^2$/L | The flux of nitrogen gas $10^{-6}$ mol/ ($m^2$ · s · Pa) | The flux of propylene $10^{-6}$ mol/ ($m^2$ · s · Pa) | The separation coefficient for nitrogen gas/propylene |
|---|---|---|---|---|
| Example 17 | 10 | 2.468 | 0.115 | 21.46 |
| Example 18 | 0.1 | 0.3008 | 0.0184 | 16.35 |
| Example 19 | 1 | 1.241 | 0.038 | 32.66 |
| Example 20 | 5 | 2.198 | 0.087 | 25.26 |

Figure 5:
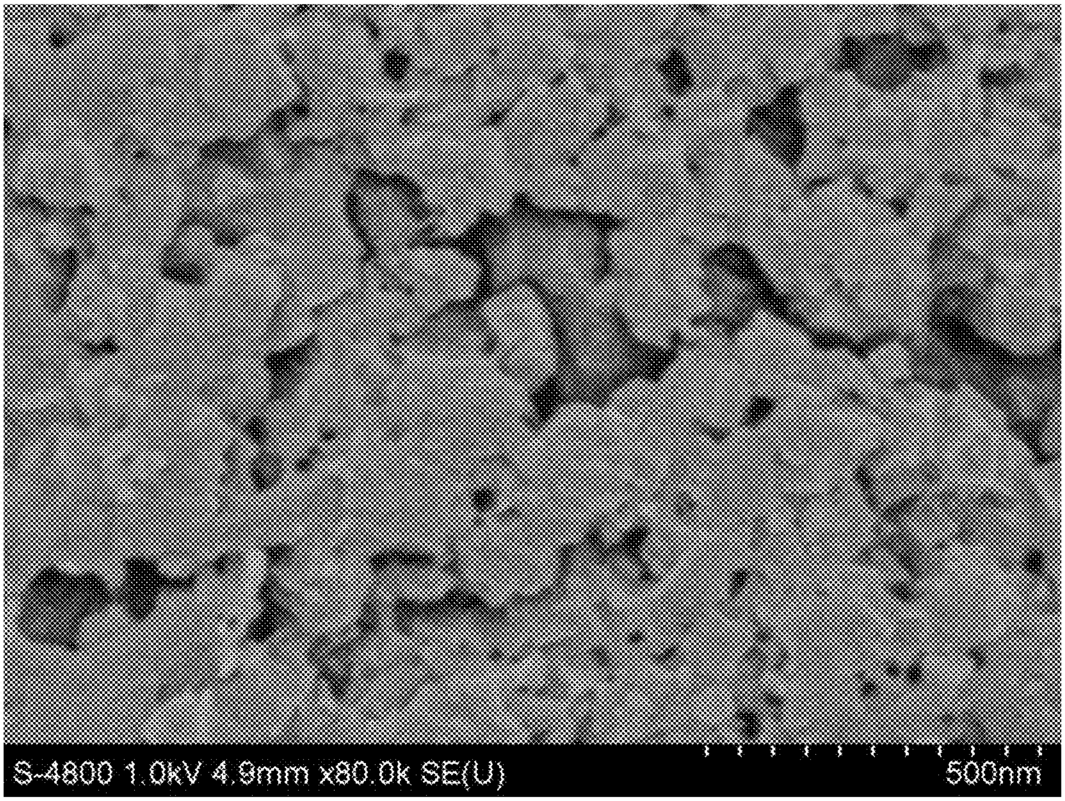
FIG. 5 shows an electron micrograph of a surface of the MOFs organic gas separation membrane prepared in Example 21.

An electron micrograph of the surface of the prepared membrane was shown in FIG. 5.

The test data for the performance of the membrane were shown in Table 6, which showed that, for a mixed gas of propylene and nitrogen gas, the flux of the nitrogen gas at 0.1 Mpa can reach $0.889\times10^{-6}$ mol/($m^2$·s·Pa), while the flux of the propylene gas was only $0.042\times10^{-6}$ mol/($m^2$·s·Pa); and a separation coefficient for nitrogen gas/propylene was 21.17.

Example 21

(1) A solution required for the preparation of a MOFs membrane

N-methylpyrrolidone, terephthalic acid, zirconium tetrachloride and glacial acetic acid were mixed in a molar ratio of 1000:1:1:500 and fully stirred to obtain the solution required for the preparation of the MOFs membrane.

(2) Base membrane pretreatment (a) acrylic acid-N-tert-butyl acrylamide/zirconium complex was dissolved in a solution, and then dissolved in water with a mass concentration of 1000 mg/L to obtain a grafting polymerization solution;

(b) After a polyethylene hollow fiber base membrane with a pore size of 500 nm was washed with water and ethanol and dried, the dried base membrane was immersed in the solution prepared in step (a) in a ratio of a surface area of the base membrane to the solution described in step (a) being 1 $m^2$/L (that is, the membrane with a surface area of 1 square meter was put in 1 L of the prepared solution described in step (a)), and a radiation grafting polymerization was allowed to proceed under microwave radiation with an intensity of 1000 μw/$cm^2$ and a frequency of 1000-200000 Hz for 2 h, to trigger methyl groups on the base membrane to generate radicals, such that a grafting polymerization reaction occurs between the radicals and double bonds in the acrylic acid-N-dipropylene enamine/zirconium complex in the grafting polymerization solution, so as to obtain a modified base membrane and introduce zirconium atoms on the surface thereof.

(3) The pretreated base membrane was immersed into the solution for the preparation of the MOFs in a ratio of a surface area of the pretreated base membrane to the solution described in step (1) being 1 $m^2$/L (that is, the membrane with a surface area of 1 square meter was put in 1 L of the solution for the preparation of the MOFs described in step (1)), to obtain a first mixture, which was then subjected to reaction for in-situ growth at 200° C. for 24 h under filling of nitrogen gas for protection, to obtain a separation membrane.

(4) The separation membrane prepared in step (3) was take out, and the unreacted monomers and the solvent on the membrane surface were cleaned away to obtain a MOFs organic gas separation membrane.

(5) The separation membrane in step (4) was cleaned to obtain a MOFs organic gas separation membrane.

Example 22

Example 22 only differs from Example 21 in that, in the base membrane pretreatment of step (2), the dried base membrane was immersed in the solution prepared in step (a) in a ratio of a surface area of the base membrane to the solution described in step (a) being 0.1 $m^2$/L (that is, the membrane with a surface area of 0.1 square meter was put in 1 L of the prepared solution described in step (a)) for grafting polymerization under radiation.

The test data for the performance of the membrane were shown in Table 6, which showed that, for a mixed gas of propylene and nitrogen gas, the flux of the nitrogen gas at 0.1 Mpa can reach $0.152\times10^{-6}$ mol/($m^2$·s·Pa), while the flux of the propylene gas was only $0.0112\times10^{-6}$ mol/($m^2$·s·Pa); and a separation coefficient for nitrogen gas/propylene was 13.57.

Example 23

Example 23 only differs from Example 21 in that, in the base membrane pretreatment of step (2), the dried base membrane was immersed in the solution prepared in step (a) in a ratio of a surface area of the base membrane to the solution described in step (a) being 5 $m^2$/L (that is, the membrane with a surface area of 5 square meter was put in 5 L of the prepared solution described in step (a)) for grafting polymerization under radiation.

The test data for the performance of the membrane were shown in Table 6, which showed that, for a mixed gas of propylene and nitrogen gas, the flux of the nitrogen gas at 0.1 Mpa can reach $1.055\times10^{-6}$ mol/($m^2$·s·Pa), while the flux of the propylene gas was only $0.087\times10^{-6}$ mol/($m^2$·s·Pa); and a separation coefficient for nitrogen gas/propylene was 12.13.

Example 24

Example 24 only differs from Example 21 in that, in the base membrane pretreatment of step (2), the dried base membrane was immersed in the solution prepared in step (a) in a ratio of a surface area of the base membrane to the solution described in step (a) being 10 $m^2$/L (that is, the membrane with a surface area of 10 square meter was put in 1 L of the prepared solution described in step (a)) for grafting polymerization under radiation.

The test data for the performance of the membrane were shown in Table 6, which showed that, for a mixed gas of propylene and nitrogen gas, the flux of the nitrogen gas at 0.1 Mpa can reach $1.386\times10^{-6}$ mol/($m^2$·s·Pa), while the flux of the propylene gas was only $0.114\times10^{-6}$ mol/($m^2$·s·Pa); and a separation coefficient for nitrogen gas/propylene was 12.16.

TABLE 6

| | The ratio of the surface area of the base membrane to the solution described in step (a) $m^2/L$ | The flux of nitrogen gas $10^{-6}$ mol/ $(m^2 \cdot s \cdot Pa)$ | The flux of propylene $10^{-6}$ mol/ $(m^2 \cdot s \cdot Pa)$ | The separation coefficient for nitrogen gas/propylene |
|---|---|---|---|---|
| Example 21 | 1 | 0.889 | 0.042 | 21.17 |
| Example 22 | 0.1 | 0.152 | 0.0112 | 13.57 |
| Example 23 | 5 | 1.055 | 0.087 | 12.13 |
| Example 24 | 10 | 1.386 | 0.114 | 12.16 |

Examples 25-29

(1) A solution required for the preparation of a MOFs membrane

N-methylpyrrolidone, terephthalic acid, zirconium tetrachloride and pure water were mixed in molar ratios of 50:1:1:0.0005, 100:1:1:0.001, 200:1:1:0.002, 500:1:1:0.005, 1000:1:1:0.001 respectively and fully stirred to obtain the solution required for the preparation of the MOFs membrane.

(2) Base membrane pretreatment (a) Polyacrylic acid, partially hydrolyzed polyacrylic acid and polyvinyl alcohol with a mass concentration of 1000 mg/L and zirconium tetrachloride were mixed in a molar ratio of 2:1, and stirred for 1 h to obtain a solution after reaction;

(b) After a polypropylene hollow fiber base membrane with a pore size of 500 nm was washed with water and ethanol and dried, the solution prepared in step (a) was coated on a dried surface of the base membrane in a ratio of a surface area of the base membrane to the solution described in step (a) being 1 $m^2/L$ (that is, the membrane with a surface area of 1 square meter was coated with 1 L of the prepared solution described in step (a)), and then dried to allow a certain amount of zirconium atoms to attach to the surface of the base membrane.

(3) The pretreated base membrane was immersed into the solution for the preparation of the MOFs in a ratio of a surface area of the pretreated base membrane to the solution described in step (1) being 1 $m^2/L$ (that is, the membrane with a surface area of 1 square meter was put in 1 L of the solution for the preparation of the MOFs described in step (1)), to obtain a first mixture, which was then subjected to reaction for in-situ growth at 120° C. for 24 h under filling of nitrogen gas for protection, to obtain a separation membrane.

(4) The separation membrane prepared in step (3) was take out, and the unreacted monomers and the solvent on the membrane surface were cleaned away to obtain a MOFs organic gas separation membrane.

(5) The separation membrane in step (4) was cleaned to obtain a MOFs organic gas separation membrane.

The separation membranes prepared in Example 25-29 were tested for separation coefficient for n-hexane gas and nitrogen gas and membrane fluxes thereof. The test data for the performance of the membrane were shown in Table 7.

TABLE 7

| | The molar ratio of N-methylpyrrolidone, terephthalic acid, zirconium tetrachloride and pure water | The flux of nitrogen gas $10^{-6}$ mol/ $(m^2 \cdot s \cdot Pa)$ | The flux of n-hexane gas $10^{-6}$ mol/ $(m^2 \cdot s \cdot Pa)$ | Separation coefficient for nitrogen gas/n-hexane |
|---|---|---|---|---|
| Example 25 | 50:1:1:0.0005 | 1.608 | 0.0473 | 34 |
| Example 26 | 100:1:1:0.001 | 2.239 | 0.0533 | 42 |
| Example 27 | 200:1:1:0.002 | 2.759 | 0.05871 | 47 |
| Example 28 | 500:1:1:0.005 | 3.253 | 0.06378 | 51 |
| Example 29 | 1000:1:1:0.01 | 10.079 | 1.120 | 9 |

It can be seen from the data in Table 7 that, as a content of the monomer in the formulation was decreased (a concentration thereof was decreased), the separation coefficient for nitrogen gas/n-hexane of the prepared separation membrane showed an increasing trend, rising from 34 to 51; and the flux were also slightly increased, rising from $1.5 \times 10^{-6}$ mol/($m^2$·s·Pa) to nearly 3×51 mol/($m^2$·s·Pa). This was mainly because that, as the concentration of the monomer was decreased, an in-situ polymerization reaction become more orderly, such that the formed functional layer had a more compact structure, decreased defects and a higher crystallinity, which was beneficial to the improvement of the separation coefficient. When the concentration of the monomer was relatively high, it was readily to form oligomers accompanied by occurrence of agglomeration phenomenon due to the high reaction speed and high ligand concentration, such that the structure of crystals was loose, whereas the oligomers blocked the channels, resulting in the reduction of the separation coefficient and the fluxes. As to the formulation in example 29, when the ratio was 1000:1:1:0.01, the separation coefficient was decreased to less than 10, but the flux exceeds $10 \times 10^{-6}$ mol/($m^2$·s·Pa), indicating that when the concentration of the monomer was too low, there will be more defects in the MOFs functional layer, and the flux will be greatly increased, such that the separation performance of the membrane cannot be maintained for a long time.

Examples 30-37

(1) A solution required for the preparation of a MOFs membrane

N-methylpyrrolidone, terephthalic acid, zirconium tetrachloride and pure water were mixed in a molar ratio of 500:1:1:0.005 and fully stirred to obtain the solution required for the preparation of the MOFs membrane.

(2) Base membrane pretreatment (a) Polyacrylic acid, partially hydrolyzed polyacrylic acid and polyvinyl alcohol with a mass concentration of 1000 mg/L and zirconium tetrachloride were mixed in a molar ratio of 2:1, and stirred for 1 h to obtain a solution after reaction;

(b) After a polypropylene hollow fiber base membrane with a pore size of 500 nm was washed with water and ethanol and dried, the solution prepared in step (a) was coated on a dried surface of the base membrane in a ratio of a surface area of the base membrane to the solution described in step (a) being 1 $m^2/L$ (that is, the membrane with a surface area of 1 square meter was coated with 1 L of the prepared solution described in step (a)), and then dried to allow a certain amount of zirconium atoms to attach to the surface of the base membrane.

(3) The pretreated base membrane was immersed into the solution for the preparation of the MOFs in a ratio of a surface area of the pretreated base membrane to the solution described in step (1) being 1 $m^2/L$ (that is, the membrane with a surface area of 1 square meter was put in 1 L of the solution for the preparation of the MOFs described in step (1)), to obtain a first mixture, which was then subjected to reaction for in-situ growth at 120° C. for 6 h, 12 h, 18 h, 24 h, 30 h, 36 h, 42 h and 48 h respectively under filling of nitrogen gas for protection, to obtain a separation membrane.

(4) The separation membrane prepared in step (3) was take out, and the unreacted monomers and the solvent on the membrane surface were cleaned away to obtain a MOFs organic gas separation membrane.

(5) The separation membrane in step (4) was cleaned to obtain a MOFs organic gas separation membrane.

The separation membranes prepared in Example 30-37 were tested for separation coefficient for n-hexane gas and nitrogen gas and membrane fluxes thereof. The test data for the performance of the membrane were shown in Table 8.

TABLE 8

| | In situ growth time h | The flux of nitrogen gas $10^{-6}$ mol/ ($m^2 \cdot s \cdot Pa$) | The flux of n-hexane gas $10^{-6}$ mol/ ($m^2 \cdot s \cdot Pa$) | Separation coefficient for nitrogen gas/n-hexane |
|---|---|---|---|---|
| Example 30 | 6 | 4.441 | 0.3965 | 11.2 |
| Example 31 | 12 | 4.276 | 0.1332 | 32.1 |
| Example 32 | 18 | 3.509 | 0.08237 | 42.6 |
| Example 33 | 24 | 3.253 | 0.06353 | 51.2 |
| Example 34 | 30 | 2.047 | 0.03914 | 52.3 |
| Example 35 | 36 | 1.462 | 0.02912 | 50.2 |
| Example 6 | 42 | 1.371 | 0.02703 | 50.7 |
| Example 37 | 48 | 1.371 | 0.0273 | 50.2 |

It can be seen from the data in Table 8 that, when the reaction time was increased from 12 h to 24 h, the separation coefficient of the MOFs separation membrane was increased rapidly from 30 to 50. Thus it can be seen that the formation of the MOFs functional layer endowed the membrane with a separation effect for nitrogen gas/n-hexane. At the same time, the flux for gas permeation was still be maintained at a high level of above $3.0\times10^{-6}$ mol/($m^2 \cdot s \cdot Pa$). Since the functional layer was composed of U10-66 with a uniform pore size distribution and a great porosity, which had a crystal lattice pore size of 0.6 nm that was slightly smaller than the size of a n-hexane molecule, the functional layer blocked the passage of n-hexane molecules, whereas a nitrogen gas molecule had a diameter of 3.4-3.6 nm, may pass through the MOFs membrane, thereby achieving a high flux.

As the reaction time was further increased, the separation coefficient remained stable at 52, while the flux was gradually decreased. The flux was decreased to less than $1.5\times10^{-6}$ mol/($m^2 \cdot s \cdot Pa$) when the reaction time was 48 h. This indicated that a continuous and dense separation layer had been formed when the reaction time was 24 h. Further increase of the reaction time would only increase the thickness of the functional layer, and even would result in that a part of oligomers, monomers and solvents was wrapped in the functional layer to block the membrane pores of the membrane, causing a decrease in permeation flux. Therefore, the best reaction time was 18-24 h. When the separation coefficient reached 50, the permeation flux of the nitrogen gas exceeded $3.1\times10^{-6}$ mol/($m^2 \cdot s \cdot Pa$), which was 10-15 times the flux of a current silicone rubber-based organic gas separation membrane, and more than 30 times the flux of an imported polyimide hydrogen gas separation membrane.

Example 38

(1) A solution required for the preparation of a MOFs membrane

N-methylpyrrolidone, terephthalic acid, zirconium tetrachloride and pure water were mixed in a molar ratio of 400:1:1:0.01 and fully stirred to obtain the solution required for the preparation of the MOFs membrane.

(2) Base membrane pretreatment (a) Polyacrylic acid, partially hydrolyzed polyacrylic acid and polyvinyl alcohol with a mass concentration of 1000 mg/L and zirconium tetrachloride were mixed in a molar ratio of 2:1, and stirred for 1 h to obtain a solution after reaction;

(b) After a polypropylene hollow fiber base membrane with a pore size of 500 nm was washed with water and ethanol and dried, the solution prepared in step (a) was coated on a dried surface of the base membrane in a ratio of a surface area of the base membrane to the solution described in step (a) being 1 $m^2/L$ (that is, the membrane with a surface area of 1 square meter was coated with 1 L of the prepared solution described in step (a)), and then dried to allow a certain amount of zirconium atoms to attach to the surface of the base membrane.

(3) The pretreated base membrane was immersed into the solution for the preparation of the MOFs in a ratio of a surface area of the pretreated base membrane to the solution described in step (1) being 1 $m^2/L$ (that is, the membrane with a surface area of 1 square meter was put in 1 L of the solution for the preparation of the MOFs described in step (1)), to obtain a first mixture, which was then subjected to reaction for in-situ growth at 120° C. for 24 h under filling of nitrogen gas for protection, to obtain a separation membrane.

(4) The separation membrane prepared in step (3) was take out, and the unreacted monomers and the solvent on the membrane surface were cleaned away to obtain a MOFs organic gas separation membrane.

(5) The MOFs organic gas separation membrane prepared in step (4) was mixed with a solution containing N-methylpyrrolidone, terephthalic acid, zirconium tetrachloride and pure water to obtain a second mixture, wherein a molar ratio of the N-methylpyrrolidone, the terephthalic acid, the zirconium tetrachloride and the pure water was 400:1:1:0.01, and a ratio of a surface area of the membrane to the solution containing the N-methylpyrrolidone, the terephthalic acid, the zirconium tetrachloride and the pure water was 0.5 $m^2/L$.

(6) the second mixture obtained in step (5) was heated at 120° C. for reaction for 12 h to obtain a separation membrane.

(7) The separation membrane in step (4) was cleaned to obtain a MOFs organic gas separation membrane.

The test data for the performance of the membrane showed that, the flux of the nitrogen gas at 0.1 Mpa can reach $3.120\times10^{-6}$ mol/($m^2$·s·Pa), while the flux of the propylene gas was only $0.089\times10^{-6}$ mol/($m^2$·s·Pa); and a separation coefficient for nitrogen gas/propylene was 35.05.

Example 39

(1) A solution required for the preparation of a MOFs membrane

N-methylpyrrolidone, terephthalic acid, zirconium tetrachloride and pure water were mixed in a molar ratio of 400:1:1:0.01 and fully stirred to obtain the solution required for the preparation of the MOFs membrane.

(2) Base membrane pretreatment (a) Polyacrylic acid, partially hydrolyzed polyacrylic acid and polyvinyl alcohol with a mass concentration of 1000 mg/L and zirconium tetrachloride were mixed in a molar ratio of 2:1, and stirred for 1 h to obtain a solution after reaction;

(b) After a polypropylene hollow fiber base membrane with a pore size of 500 nm was washed with water and ethanol and dried, the solution prepared in step (a) was coated on a dried surface of the base membrane in a ratio of a surface area of the base membrane to the solution described in step (a) being 1 $m^2$/L (that is, the membrane with a surface area of 1 square meter was coated with 1 L of the prepared solution described in step (a)), and then dried to allow a certain amount of zirconium atoms to attach to the surface of the base membrane.

(3) The pretreated base membrane was immersed into the solution for the preparation of the MOFs in a ratio of a surface area of the pretreated base membrane to the solution described in step (1) being 1 $m^2$/L (that is, the membrane with a surface area of 1 square meter was put in 1 L of the solution for the preparation of the MOFs described in step (1)), to obtain a first mixture, which was then subjected to reaction for in-situ growth at 120° C. for 24 h under filling of nitrogen gas for protection, to obtain a separation membrane.

(4) The separation membrane prepared in step (3) was take out, and the unreacted monomers and the solvent on the membrane surface were cleaned away to obtain a MOFs organic gas separation membrane.

(5) The MOFs organic gas separation membrane prepared in step (4) was mixed with a solution containing N-methylpyrrolidone, terephthalic acid, zirconium tetrachloride and pure water to obtain a second mixture, wherein a molar ratio of the N-methylpyrrolidone, the terephthalic acid, the zirconium tetrachloride and the pure water was 400:1:1:0.01, and a ratio of a surface area of the membrane to the solution containing the N-methylpyrrolidone, the terephthalic acid, the zirconium tetrachloride and the pure water was 0.5 $m^2$/L.

(6) the second mixture obtained in step (5) was heated at 120° C. for reaction for 12 h to obtain a separation membrane.

(7) Siloxane coating:

Hydroxysilane, ethyl orthosilicate and n-hexane in a ratio of 1:0.2:8.8 were mixed at room temperature, and stirred at a high speed for 24 h for dissolution, to which 0.01% dibutyltin dilaurate was added to allow pre-crosslinking for 5 h to obtain a silane coating liquid with a viscosity of 100 mPa·s. Thereafter, the MOFs organic gas separation membrane prepared in step (6) was soaked into the silane coating liquid, and taken out after standing for 100 s, wherein the thickness of the coating liquid was 5-10 microns.

(8) Thermal crosslinking: the coated organic gas separation membrane was subjected to thermal crosslinking at 80° C. for 1 h to finally obtain an organic gas separation membrane with a three-layer structure.

The test data for the performance of the membrane showed that, the flux of the nitrogen gas at 0.1 Mpa can reach $1.086\times10^{-7}$ mol/($m^2$·s·Pa), while the flux of the propylene gas was only $0.03298\times10^{-7}$ mol/($m^2$·s·Pa); and a separation coefficient for nitrogen gas/propylene was 32.92.

Comparative Example 1

(1) Preparation of a Precursor Solution 0.42 g of zirconium chloride and 0.30 g of terephthalic acid were dissolved in 67.5 mL of N,N-dimethylformamide (DMF), to which 32 μL of deionized water was added, and the resultant was stirred under a ultrasound condition to allow the reagents to be fully dissolved, and the obtained clear precursor solution was transferred to a hydrothermal kettle;

(2) Heat Treatment

A polyvinylidene fluoride (PVDF) hollow fiber membrane was vertically soaked in the prepared precursor solution with a fixed support, and then subjected to a heat treatment at 120° C. under a constant temperature condition for 72 h. During the heat treatment, the hollow fiber membrane was still dissolved in the precursor solution, and the preparation of a separation membrane cannot be further completed.

Figure 6:
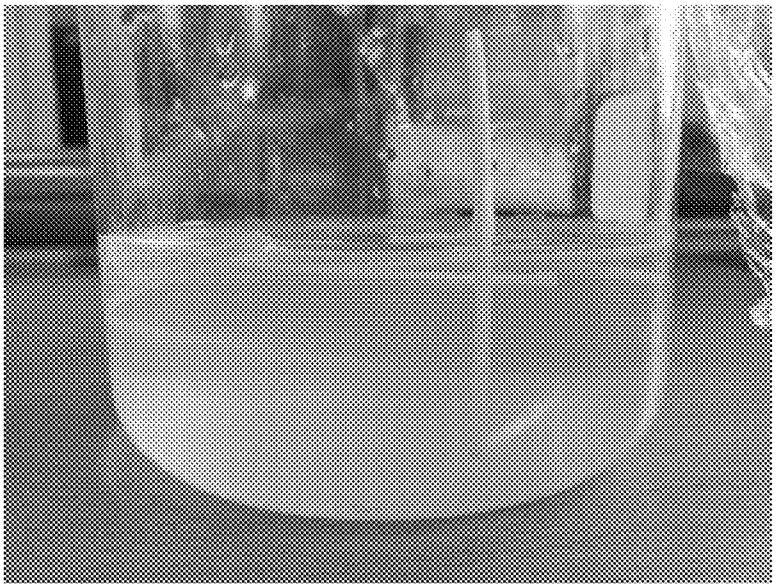
FIG. 6 is a photograph of a polyvinylidene fluoride (PVDF) substrate after being soaked in a precursor solution in comparative example 1.

The characterizations of the base membrane and the solution after reaction were shown in FIG. 6.

Comparative Example 2

(1) A precursor solution required for the preparation of the MOFs membrane

The precursor solution required for the preparation of the MOFs membrane is the same as that of Example 1.

(2) Base membrane pretreatment (a) This step is same as that of Example 1;

(b) Polyvinylidene fluoride (PVDF) membrane with a pore size of 500 nm was used, and the rest was the same as that of Example 1. The resultant was subjected to a heat treatment at 120° C. under a constant temperature condition for 72 h. During the heat treatment, the hollow fiber membrane was still dissolved in the precursor solution, and the preparation of a separation membrane cannot be further completed.

Figure 7:
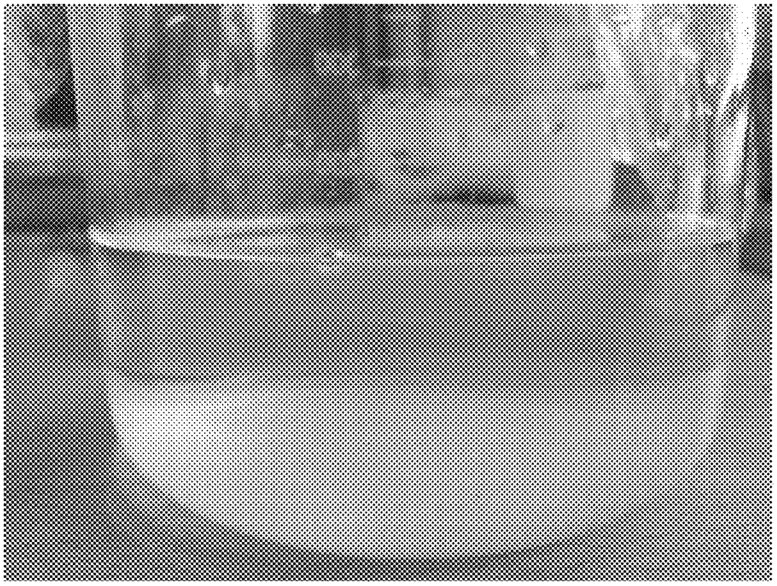
FIG. 7 is a photograph of a polyvinylidene fluoride (PVDF) substrate after being soaked in the precursor solution in comparative example 2.

The characterizations of the base membrane and the solution after reaction were shown in FIG. 7.

Comparative Example 3

(1) Preparation of a Precursor Solution 0.42 g of zirconium chloride and 0.30 g of terephthalic acid were dissolved in 67.5 mL of N,N-dimethylformamide (DMF), to which 32 μL of deionized water was added, and the resultant was stirred under a ultrasound condition to allow the reagents to be fully dissolved, and the obtained clear precursor solution was transferred to a hydrothermal kettle;

(2) Heat Treatment

A polypropylene hollow fiber membrane was vertically soaked in the prepared precursor solution with a fixed support, and subjected to a heat treatment at 120° C. under a constant temperature condition for 72 h, and then naturally cooled after heat treatment;

(3) Ultrasonic Treatment

The obtained membrane was taken out and subjected to an ultrasonic treatment for 5 s to remove the particles with poor adhesion, so as to obtain a substrate with crystal seeds;

(4) Formation of a Continuous Membrane

The substrate on which the crystal seeds was deposited was subjected to a heat treatment twice in the same method as step (2) to obtain a continuous membrane; and the continuous membrane was cleaned first with DMF and then with methanol, and dried at room temperature.

Figure 8:
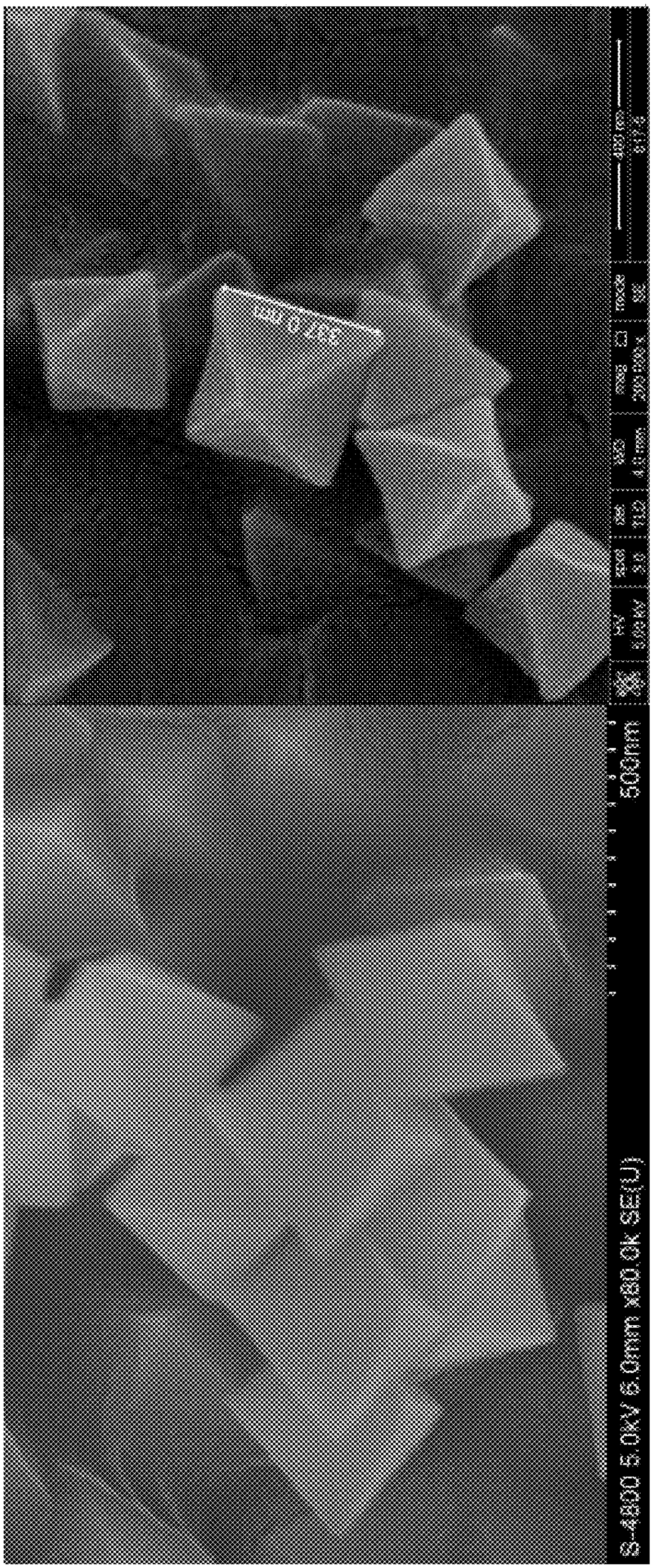
FIG. 8 shows an electron micrograph of a surface of the MOFs organic gas separation membrane prepared in comparative example 3.

An electron micrograph of the surface of the prepared membrane was shown in FIG. 8. It can be seen from FIG. 8 that the individually octahedron structures in the MOFs functional layer of the prepared membrane was present independently of each other and an inter-embedded structure was not formed.

Comparative Example 4

(1) A solution required for the preparation of a MOFs membrane

N-methylpyrrolidone, terephthalic acid, zirconium tetrachloride and pure water were mixed in a molar ratio of 400:1:1:0.01 and fully stirred to obtain the solution required for the preparation of the MOFs membrane.

(2) After a polypropylene hollow fiber base membrane with a pore size of 500 nm was washed with water and ethanol and dried, the dried base membrane was immersed into the solution for the preparation of the MOFs membrane in a ratio of a surface area of the pretreated base membrane to the solution described in step (1) being 1 $m^2/L$ (that is, the membrane with a surface area of 1 square meter was put in 1 L of the solution for the preparation of the MOFs described in step (1)) to obtain a first mixture, which was then subjected to reaction for in-situ growth at 120° C. for 24 h under filling of nitrogen gas for protection, to obtain a separation membrane.

(3) The separation membrane prepared in step (2) was take out, and the unreacted monomers and the solvent on the membrane surface were cleaned away to obtain a MOFs organic gas separation membrane.

(4) The separation membrane in step (3) was cleaned to obtain a MOFs organic gas separation membrane.

Figure 9:
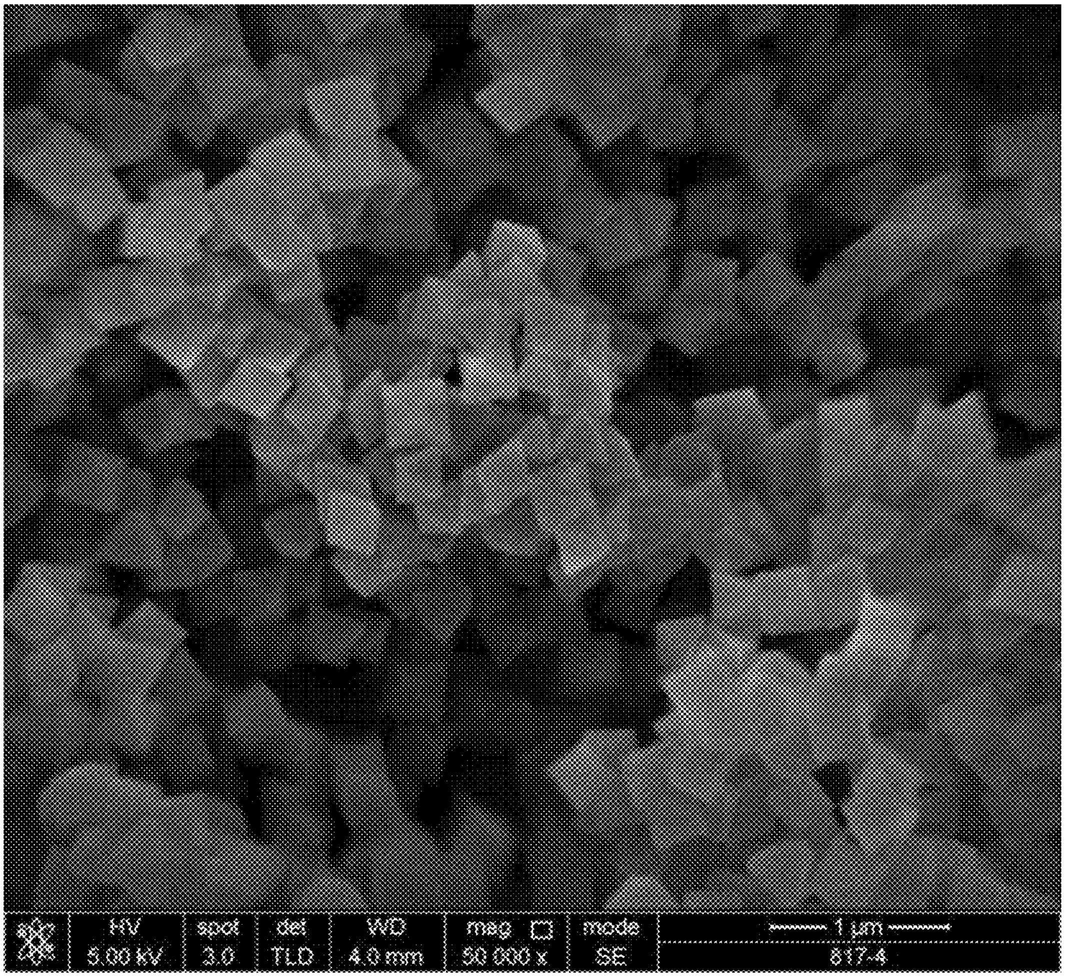
FIG. 9 shows an electron micrograph of a surface of the MOFs organic gas separation membrane prepared in comparative example 4.

An electron micrograph of the surface of the prepared membrane was shown in FIG. 9. It can be seen from FIG. 9 that when the base membrane was not pretreated, some discontinuous crystals were attached to the base membrane, and the crystals were composed of a plurality of octahedrons agglomerated together, and a continuous structure was not formed.

The present invention is not subject to any limitation of the embodiments. The present invention has been described with reference to typical examples, but it should be understood that the words used therein are descriptive and explanatory words, rather than restrictive words. The present invention may be modified as required within the scope of the claims of the present invention, and the present invention may be revised without departing from the scope and spirit of the present invention. Although the present invention described herein relates to specific methods, materials and examples, it does not mean that the present invention is limited to the specific examples disclosed herein. Instead, the present invention may be extended to all of other methods and applications with the same function.

DESCRIPTION OF REFERENCE NUMERALS

1. Purging gas
2. Feed gas
3. Temperature sensor

4. Humidity sensor
5. Membrane assembly
6. Pressure gauge
7. Gas chromatograph
8. Soap-membrane flowmeter.

The invention claimed is:

1. A metal-organic framework material separation membrane, comprising a base membrane and a metal-organic framework material functional layer which comprises a plurality of inter-embedded polyhedrons, each polyhedron is composed of a plurality of crystal lattices, and among the plurality of inter-embedded polyhedrons, two adjacent polyhedrons share crystal lattices and/or have a distance between centers of the two adjacent polyhedrons of less than an average value L of lengths of the two adjacent polyhedrons, wherein the base membrane is selected from one or more of polypropylene membrane, polyethylene membrane, polyvinyl chloride membrane, and polytetrafluoroethylene membrane.

2. The separation membrane according to claim 1, wherein the metal-organic framework material functional layer has an average pore size of 0.1-2.0 nm, and the metal-organic framework material functional layer has a thickness of 200-5000 nm.

3. The separation membrane according to claim 1, wherein the base membrane has a pore size of 10-10000 nm.

4. The separation membrane according to claim 1, wherein the separation membrane further comprises an organosilicon layer on the surface of the metal-organic framework material functional layer.

5. A preparation method for a metal-organic framework material separation membrane, comprising the following steps:

(1) preparing a solution containing a first organic solvent, an organic ligand, a first metal compound, and an auxiliary agent that is water or glacial acetic acid;

(2) subjecting a base membrane to a pretreatment, wherein the pretreatment comprises introducing, on the surface of the base membrane, metal atoms of the first metal compound in step (1);

(3) mixing the pretreated base membrane in step (2) with the solution in step (1) to obtain a first mixture, and heating the first mixture for reaction, so as to obtain the metal-organic framework material separation membrane; and (4) optionally, subjecting the separation membrane to a cleaning treatment, wherein in step (3), a ratio of a surface area of the pretreated base membrane in step (2) to a volume of the solution obtained in step (1) is (0.01-100) $m^2/L$, and wherein the base membrane is selected from one or more of polypropylene membrane, polyethylene membrane, polyvinyl chloride membrane, and polytetrafluoroethylene membrane.

6. The method according to claim 5, wherein, in step (1), a molar ratio of the first organic solvent, the organic ligand and the first metal compound is (10-1000):(1-100):(1-100);

when the auxiliary agent is water, a molar ratio of the first organic solvent and the auxiliary agent water is 100:(0.001-0.05), when the auxiliary agent is glacial acetic acid, a molar ratio of the first organic solvent and the auxiliary agent glacial acetic acid is 100:(20-60);

the first organic solvent is selected from one or more of N-methylpyrrolidone, N,N-dimethylformamide, and dimethylacetamide, the organic ligand is selected from one or more of terephthalic acid and nitroterephthalic acid; and the first metal compound is selected from one or more of zirconium compound, niobium compound, molybdenum compound, and cobalt compound.

7. The method according to claim 5, wherein the base membrane has a pore size of 10-10000 nm.

8. The method according to claim 5, wherein the step (2) comprises the following steps:

(2A-1) preparing a solution containing polyacrylic acid, polyvinyl alcohol and a second metal compound, and (2A-2) coating the solution obtained from step (2A-1) onto the base membrane.

9. The method according to claim 5, wherein the step (2) comprises the following steps:

(2B-1) preparing a solution containing a metal complex of formula I and a second organic solvent, (2B-2) mix the base membrane with the solution obtained from step (2B-1), and (2B-3) cleaning the mixed base membrane in step (2B-2) by using a third solvent, Formula I

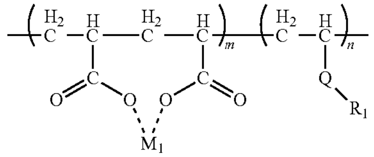

wherein, in formula I, Q is selected from acylamino, carbonyl, and C1-C6 alkylene; $R_1$ is selected from hydrogen, C1-C6 alkyl, C1-C6 alkoxy, and halogen; $M_1$ is the same as a metal atom in the first metal compound in step (1); m is 5-20; and n is 1-10;

the second organic solvent is selected from one or more of organic solvents capable of causing the base membrane to swell;

the third solvent is selected from one or more solvents capable of causing the swollen base membrane to deswell.

10. The method according to claim 5, wherein the step (2) comprises the following steps:

(2C-1) preparing a solution containing a metal complex of formula II, and (2C-2) mixing the base membrane with the solution obtained from step (2C-1) to obtain a mixture, and subjecting the mixture to polymerization reaction under microwave radiation conditions;

Formula II

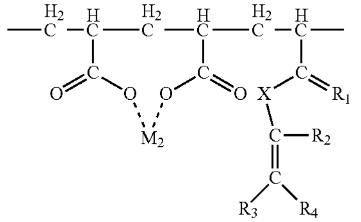

wherein, in formula II, X is selected from acylamino, carbonyl, and $C_1$-$C_6$ alkylene; $R_2$, $R_3$ and $R_4$ are the same or different, each independently selected from hydrogen, C1-C6 alkyl, C1-C6 alkoxy, and halogen; and $M_2$ is the same as a metal atom in the first metal compound in step (1).

11. The method according to claim 5, wherein in the step (3), a reaction temperature is 50-300° C., a reaction pressure is 0.01-0.5 MPa, and a reaction time is 1-100 h.

12. The method according to claim 5, further comprising: (5) subjecting the metal-organic frame material separation membrane obtained in step (3) or (4) to a repairing treatment for at least one time, wherein the repairing treatment comprises the following steps:

(A) mixing the metal-organic framework material separation membrane with a solution containing a first organic solvent, an organic ligand, a first metal compound and an auxiliary agent to obtain a second mixture, wherein the auxiliary agent is selected from water or glacial acetic acid;

(B) heating the second mixture for reaction to obtain the metal-organic framework material separation membrane; and (C) optionally, subjecting the separation membrane to a cleaning treatment;

wherein in step (B), a reaction temperature is 50-300° C., a reaction pressure is 0.01-0.5 MPa, and a reaction time is 1-100 h.

13. The method according to claim 12, further comprising: coating a silane coating liquid onto a surface of the metal-organic framework material separation membrane prepared in step (3) or (4) or (B) or (C), heating the metal-organic framework material separation membrane coated with the silane coating liquid to subject the silane coating liquid to a crosslinking reaction, so as to obtain a metal-organic frame material separation membrane having an organosilicon layer, wherein a temperature of the crosslinking reaction is 50-300° C., and a time therefor is 0.1-20 h.

14. A metal-organic framework material separation membrane prepared by the method according to claim 5.

15. The separation membrane according to claim 1, wherein the two adjacent polyhedrons share crystal lattices and/or the distance between centers of the two adjacent polyhedrons is 0.2-0.9 L.

16. The separation membrane according to claim 1, wherein at least 20% of the polyhedrons in the metal-organic framework material functional layer are inter-embedded.

17. The separation membrane according to claim 1, wherein at least 80% of the polyhedrons in the metal-organic framework material functional layer are inter-embedded.

18. The separation membrane according to claim 1, wherein the polyhedron includes hexahedron, octahedron, or both, and a length of the polyhedron is 50-2000 nm.

19. The separation membrane according to claim 18, wherein the length of the hexahedron is 50-1000 nm, and the length of the octahedron is 200-2000 nm.

20. The separation membrane according to claim 1, wherein the crystal lattice is composed of a metal atom and organic ligands, and the metal atom is selected from zirconium atom, niobium atom, molybdenum atom, and cobalt atom; and the organic ligand is selected from one or more of terephthalic acid and nitroterephthalic acid.

21. The method according to claim 6, wherein in step (1), the molar ratio of the first organic solvent, the organic ligand and the first metal compound is (400-600):1:1; and the first metal compound is zirconium tetrachloride.

22. The method according to claim 8, wherein a mass concentration of the polyacrylic acid and the polyvinyl alcohol in the solution is 500-2000 mg/L, a molar ratio of a sum of polyacrylic acid and polyvinyl alcohol to the metal compound is 1-3:1;

a metal atom in the second metal compound is the same as a metal atom in the first metal compound in step (1); and in step (2A-2), a ratio of a surface area of the base membrane to a volume of the solution obtained in step (2A-1) is 0.1-10 $m^2$/L.

23. The method according to claim 22, wherein the second metal compound is selected from one or more of zirconium compound, niobium compound, molybdenum compound, and cobalt compound.

24. The method according to claim 9, wherein $M_1$ is selected from zirconium atom, niobium atom, molybdenum atom, and cobalt atom;

the second organic solvent is selected from one or more of C5-C10 aliphatic hydrocarbon, C1-C10 halogenated aliphatic hydrocarbon, C6-C20 aromatic hydrocarbon, and C6-C20 halogenated aromatic hydrocarbon;

the third solvent is water;

in the solution of step (2B-1), a mass concentration of the metal complex of formula I is 500-2000 mg/L; and in step (2B-2), a ratio of a surface area of the base membrane to a volume of the solution obtained in step (2B-1) is 0.1-10 $m^2$/L.

25. The method according to claim 1, wherein $M_1$ is selected from one or more of n-pentane, n-hexane, trichloromethane, carbon tetrachloride, benzene, and toluene.

26. The method according to claim 10, wherein $M_2$ is selected from zirconium atom, niobium atom, molybdenum atom, and cobalt atom;

the solution of the metal complex in step (2C-1) is an aqueous solution of the metal complex, and a mass concentration of the metal complex of formula II is 500-20000 mg/L;

in step (2C-2), a ratio of a surface area of the base membrane to a volume of the solution obtained in step (2C-1) is 0.1-10 $m^2$/L; and in step (2C-2), the microwave radiation has a microwave intensity of 500-2000 W/$cm^2$, and a frequency of 1000-200000 Hz.

* * * * *